(12) United States Patent
Yumiki et al.

(10) Patent No.: US 7,999,969 B2
(45) Date of Patent: Aug. 16, 2011

(54) IMAGING DEVICE, PRINTING SYSTEM, PRINTING DEVICE, IMAGE PRINTING METHOD, AND STORAGE MEDIUM HAVING STORED THEREON PROGRAM CONTROLLING THE IMAGE PRINTING METHOD

(75) Inventors: Naoto Yumiki, Osaka (JP); Kenichi Honjo, Osaka (JP)

(73) Assignee: Panasonic Corporation, Osaka (JP)

( * ) Notice: Subject to any disclaimer, the term of this patent is extended or adjusted under 35 U.S.C. 154(b) by 558 days.

(21) Appl. No.: 11/910,872

(22) PCT Filed: Feb. 17, 2006

(86) PCT No.: PCT/JP2006/302807
§ 371 (c)(1),
(2), (4) Date: Dec. 4, 2008

(87) PCT Pub. No.: WO2006/112125
PCT Pub. Date: Oct. 26, 2006

(65) Prior Publication Data
US 2009/0141291 A1    Jun. 4, 2009

(30) Foreign Application Priority Data

Apr. 8, 2005  (JP) .................................. 2005-112483
Jul. 20, 2005  (JP) .................................. 2005-209519

(51) Int. Cl.
*G06K 15/02* (2006.01)
*H04N 1/409* (2006.01)

(52) U.S. Cl. ........................... 358/1.2; 358/3.26; 396/52

(58) Field of Classification Search ................... 358/1.1, 358/1.2, 1.9, 3.26, 3.27, 1.14; 396/52, 54, 396/55
See application file for complete search history.

(56) References Cited

U.S. PATENT DOCUMENTS

| 5,499,068 A | 3/1996 | Satoh et al. |
| 5,537,185 A | 7/1996 | Ohishi et al. |
| 5,713,049 A | 1/1998 | Ohishi et al. |
| 6,771,308 B1 * | 8/2004 | Yamamoto et al. ........ 348/207.2 |

FOREIGN PATENT DOCUMENTS

| JP | 05-142638 | 6/1993 |
| JP | 05142638 A * | 6/1993 |
| JP | 05-289139 | 11/1993 |
| JP | 06-308565 | 11/1994 |
| JP | 10-107981 | 4/1998 |
| JP | 2001-008061 | 1/2001 |
| WO | WO 2004059380 A1 * | 7/2004 |

* cited by examiner

*Primary Examiner* — Thomas D Lee
(74) *Attorney, Agent, or Firm* — McDermott Will & Emery LLP

(57) ABSTRACT

In the case of printing while a digital camera is directly connected to a printer, it has been impossible to determine to what extent image blurring affects a print image. In an imaging device, a detection section (17A) detects blurring. An image blurring compensation section (15A) compensates image blurring. A compensation amount detection section (16) detects an image blurring compensation amount. A calculation section (19A) calculates a residual blurring amount by subtracting the image blurring compensation amount from an image blurring amount. An image recording section (12) records an image signal, as a shot image, together with the residual blurring amount. A print size specification section (91) specifies a print size of the shot image and stores a tolerance (β) of the residual blurring amount with respect to the print size. And, a determination section (80) determines whether or not the residual blurring amount is equal to or greater than the tolerance with respect to a predetermined print size, and issues a warning to a photographer or the like in the case where the residual blurring amount is greater than the tolerance.

15 Claims, 17 Drawing Sheets

(a)

(b)

(a)

(b)

IMAGING DEVICE, PRINTING SYSTEM, PRINTING DEVICE, IMAGE PRINTING METHOD, AND STORAGE MEDIUM HAVING STORED THEREON PROGRAM CONTROLLING THE IMAGE PRINTING METHOD

RELATED APPLICATIONS

This application is the U.S. National Phase under 35 U.S.C. §371 of International Application No. PCT/JP2006/302807, filed on Feb. 17, 2006, which in turn claims the benefit of Japanese Application No. 2005-112483, filed on Apr. 8, 2005 and Japanese Application No. 2005-209519, filed on Jul. 20, 2005, the disclosure of which Applications are incorporated by reference herein.

TECHNICAL FIELD

The present invention relates to a method for printing an image shot by an imaging device, and more particularly to an imaging device, a printing device, and a printing system which control a printing method of a shot image, an image printing method, and a storage medium having stored thereon a control program of the image printing method.

BACKGROUND ART

Recently, an imaging sensor such as a CCD (Charge Coupled Device) and a CMOS (Complementary Metal-Oxide Semiconductor), and a signal processing circuit are increasingly improved in terms of integration density and come to be available inexpensively. Accordingly, an imaging device typified by a digital still camera and a digital video camera (hereinafter jointly referred to as a "digital camera"), which are capable of converting an optical image of an object into an electrical image signal by using such an imaging sensor, is rapidly growing popular.

In the case where an image shot with a digital camera is to be printed, shot image data is first imported to a personal computer which is connected to an imaging device. A printing device connected to the personal computer prints the shot image on a paper sheet in response to a print command issued by the personal computer.

However, at the time of an operation of importing the shot image to the personal computer or outputting the same to a connected printing device, a person who has shot the image or performs the above-described operation (hereinafter referred to as a "photographer or the like") needs to operate the personal computer. That is, the operation is not easy but problematic for the photographer or the like if he/she is unaccustomed to the personal computer. Further, in order to perform the operation, the personal computer needs to have software for importing the shot image thereto or for outputting the shot image to the printing device.

In order to respond to such a problem or requirement, a printing device, which is directly connected to the digital camera and thus capable of printing the shot image without using a personal computer, has been proposed (Patent Document 1). Accordingly, even a photographer or the like who is unaccustomed to the printing device can easily print the shot image.

On the other hand, a system has been proposed, which records a hand blurring amount at the time of shooting together with the shot image, determines whether or not the shot image can be printed out appropriately at the time of printing in consideration of the hand blurring amount as a criterion, and issues a warning in the case where the printing is determined to be impossible (Patent Document 2).

Patent Document 1: Japanese Laid-Open Patent Publication No. 10-107981
Patent Document 2: Japanese Laid-Open Patent Publication No. 2001-8061

DISCLOSURE OF THE INVENTION

Problems to be Solved by the Invention

However, the above-described conventional imaging devices, respectively, have problems described as follows. First, regarding a printing device described in Patent Document 1, a case where an ink-jet printer or the like is directly connected to an imaging device and a shot image is printed out will be described. It is difficult to determine whether or not the shot image is blurred through a display device such as an LCD which is mounted in the imaging device, and thus a problem is caused in that determination cannot be made unless printing is actually performed. Therefore, a blurred image may be actually printed out as an unsatisfactory result, leading to inconvenience to a photographer or the like.

A digital camera having a printer integrated thereinto as described in Patent Document 2 is capable of utilizing a blurring amount as the criterion at the time of printing. A recent printing device such as the ink-jet printer is adaptable to print on not only L-size but also A4-size and A3-size paper sheets. Therefore, the larger a print size is, the more conspicuous the blurring amount of a printed image becomes, even if the blurring amount does not change. Therefore, a problem resides in the fact that unless the criterion of the blurring amount is changed in accordance with a paper size specified at the time of printing, it is difficult to determine, prior to actual printing, whether or not the blurring amount is appropriate to the printing. This is inconvenient to the photographer or the like.

In consideration of the above-described problems, an object of the present invention is to provide an imaging device, a printing system, a printing device, and a printing method which are capable of printing by using a tolerable blurring amount corresponding to a print size as the criterion, and a storage medium having stored thereon a program for controlling the printing method.

Solution to the Problems

An object of the present invention is attained by using an imaging device having a configuration described below.

One example is an imaging device operable to output an optical image of an object as an electrical image signal and transfer the electrical image signal to a connected printing device, the imaging device comprises:

an imaging optical system for generating the optical image of the object;

imaging means for receiving the optical image generated by the imaging optical system, and converting the optical image into the electrical image signal;

blurring detection means for detecting an image blurring amount in the imaging optical system;

image blurring compensation means for compensating the image blurring on the imaging means;

compensation amount detection means for detecting an image blurring compensation amount compensated by the image blurring compensation means;

calculation means for calculating a residual blurring amount by subtracting the image blurring compensation amount from the image blurring amount;

image recording means for recording the image signal, as a shot image, together with the calculated residual blurring amount;

print size specification means for specifying a print size of the shot image;

print control means for generating print data in accordance with the shot image; print data output means for outputting the generated print data; and determination means for storing a tolerance of the residual blurring amount with respect to the print size and determining whether or not the calculated residual blurring amount is equal to or greater than the tolerance, wherein the determination means issues a warning in the case where the calculated residual blurring amount is greater than the tolerance with respect to a predetermined print size.

Another example is an imaging device operable to output an optical image of an object as an electrical image signal and transfer the electrical image signal to a connected printing device, the imaging device comprises:

an imaging optical system for generating the optical image of the object;

imaging means for receiving the optical image generated by the imaging optical system, and converting the optical image into the electrical image signal;

blurring detection means for detecting an image blurring amount in the imaging optical system;

image blurring compensation means for compensating the detected image blurring amount;

compensation amount detection means for detecting an image blurring compensation amount having been compensated;

calculation means for calculating a residual blurring amount by subtracting the image blurring compensation amount from the detected image blurring amount;

image recording means for recording the image signal, as a shot image, together with the calculated residual blurring amount;

display means for displaying the shot image; print control means for generating print data in accordance with the shot image;

print data output means for outputting the generated print data; and determination means for storing a tolerance of the residual blurring amount with respect to the print size at a time of printing, and determining whether or not the calculated residual blurring amount is equal to or lower than the tolerance, wherein the determination means calculates the print size such that the calculated residual blurring amount is equal to or lower than the tolerance, and causes the display means to display the calculated print size together with the shot image.

Effect of the Invention

As described above, according to the present invention, it is possible to provide a printing system, a printing device, a printing method, and a storage medium having stored thereon a program for controlling the printing method, which are capable of determining whether or not a residual blurring amount is at a predetermined level depending on a printing paper size, and further displaying a recommended print size corresponding to the residual blurring amount, thereby relieving a user of the bother of determining which size is appropriate for printing.

Figure 1:
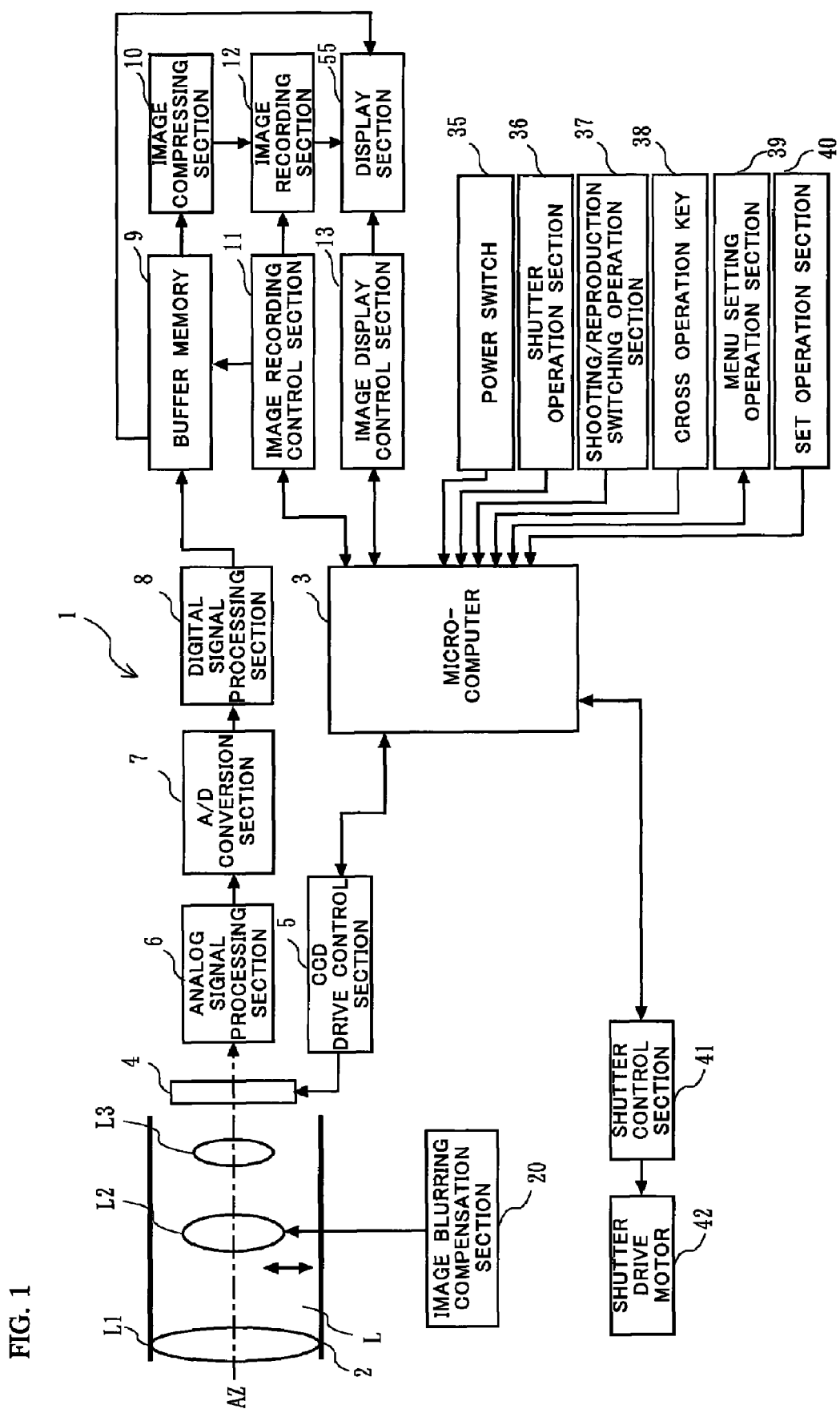
FIG. 1 is a block diagram showing a control system of a digital camera according to an embodiment of the present invention.

DESCRIPTION OF THE REFERENCE CHARACTERS 1 digital camera
1a housing
2 lens barrel
3 microcomputer
4 imaging sensor
5 CCD drive control section
6 analog signal processing section 7 A/D conversion section
8 digital signal processing section
9 buffer memory
10 image compressing section
11 image recording control section
12 image recording section
13 image display control section
15A motion compensation section
15x yawing drive control section
15y pitching drive control section
16x, 16y position detection section
17A motion detection section
17x yawing angular velocity sensor
17y pitching angular velocity sensor
19A residual blurring amount calculation section
20 image blurring compensation mechanism
21 pitching holding frame
22 yawing holding frame
29 actuator
35 power switch
36 shutter operation section
37 shooting/reproduction switching operation section
38 cross operation key
39 MENU setting operation section
40 SET operation section
50 internal memory
51 removable memory
55 display section
57 zoom operation section
64 printing paper
65 print character
66 printing paper
71 image print control section
72 print data output section
73 USB cable
74 printing device
80 residual blurring amount determination section
81 tolerance changing section
90 print menu screen
91 paper size setting icon
92 paper size pull-down menu screen
93 print start icon
95 recommended paper size icon
101 thumbnail display icon
102 print start icon
103 paper size icon

BEST MODE FOR CARRYING OUT THE INVENTION

First Embodiment

Hereinafter, with reference to FIGS. 1, 2, 3, 4, 5, 6, 7, 8, 9, and 10, a first embodiment of the present invention will be described. First, with reference to FIG. 1, a digital camera configured as the first embodiment of the present invention will be described. The digital camera 1 includes an imaging optical system L, a microcomputer 3, an imaging sensor 4, a CCD drive control section 5, an analog signal processing section 6, an A/D conversion section 7, a digital signal processing section 8, a buffer memory 9, an image compressing section 10, an image recording control section 11, an image recording section 12, an image display control section 13, an image blurring compensation mechanism 20, a power switch 35, a shutter operation section 36, a shooting/reproduction switching operation section 37, a cross operation key 38, a SET operation key 40, a shutter control section 41, and a shutter drive motor 42.

The imaging optical system L is constituted of three lens units, i.e., a first lens unit L1, a second lens unit L2, and a third lens unit L3. The first lens unit L1 and the second lens unit L2 move in an optical axis direction, whereby zooming is performed. The third lens unit L3 moves in the optical axis direction, whereby focusing is performed. Further, the second lens unit L2 is a compensation lens unit, and plays a role of compensating a motion of an image by moving on a plane orthogonal to an optical axis AZ so as to decenter the optical axis. The imaging optical system L is not limited to the above-described optical system configuration.

When jitter or the like of the digital camera 1 is caused by a mechanical vibration or by a photographer, an optical axis of light emitted from an object toward a lens is misaligned with an optical axis of the lens. Therefore, an image to be obtained will a blurred image. A preventive mechanism provided against this called an image blurring compensation mechanism.

The microcomputer 3 controls various control sections of the digital camera 1. Further, the microcomputer 3 is capable of receiving a signal outputted from each of the power switch 35, the shutter operation section 36, the shooting/reproduction switching operation section 37, the cross operation key 38, the MENU setting operation section 39, and the SET operation section 40.

In response to a timing signal generated by the shutter operation section 36, the shutter control section 41 drives the shutter drive motor 42 in accordance with a control signal outputted by the microcomputer 3, then actuates the shutter.

The imaging sensor 4 is a CCD, and converts an optical image formed by the imaging optical system L into an electrical signal. The imaging sensor 4 is drive-controlled by the CCD drive control section 5. A CMOS may be used as the imaging sensor 4.

An image signal outputted by the imaging sensor 4 is processed through the analog signal processing section 6, the A/D conversion section 7, the digital signal processing section 8, the buffer memory 9, and the image compressing section 10 in sequence. In the analog signal processing section 6, the image signal outputted by the imaging sensor 4 is subjected to analog signal processing such as gamma processing. The A/D conversion section 7 converts an analog signal outputted by the analog signal processing section 6 into a digital signal. In the digital signal processing section 8, the image signal converted into the digital signal by the A/D conversion section 7 is subjected to digital signal processing such as noise reduction, edge enhancement, and the like. The buffer memory 9 is a PAM (Random Access Memory), and temporarily stores the image signal processed by the digital signal processing section 8.

The image signal stored in the buffer memory 9 is further processed through the image compressing section 10 and the image recording section 12 in sequence. The image signal stored in the buffer memory 9 is transmitted to the image compressing section 10 in accordance with a command outputted by the image recording control section 11. At this time, the image signal is compressed and becomes a smaller size of data than an original thereof. As a compression method like this, a JPEG (Joint Photographic Experts Group) method, for example, is adopted. The compressed image signal is thereafter transmitted to the image recording section 12.

The image recording section 12 is constituted of an internal memory 50 (not shown) mounted in a body of the digital camera 1 and/or a removable memory 51 (not shown). In accordance with the command outputted by the image recording control section 11, the image signal is interrelated with predetermined information to be stored, and an image file is generated. The generated image file is stored in the image recording section 12. The image file includes a data section having the image signal stored therein, and a header section or a footer section having the predetermined information stored therein. The predetermined information, which is stored in the image file together with the image signal, includes information about a date and time when an image was shot, focal length information, shutter speed information, aperture value information, and shooting mode information. The predetermined information is, for example, in an Exif® format, or in a format similar to the Exif® format.

The image display control section 13 is controlled by the control signal outputted by the microcomputer 3. In accordance with a command from the image display control section 13, the display section 55 displays a shot image as a visible image in accordance with the image signal stored in the image recording section 12 or in the buffer memory 9. As display modes, the display section 55 has a mode for displaying an image signal only, and a mode for displaying information at the time of shooting of the image signal. The information about the image signal at the time of shooting includes the focal length information, the shutter speed information, the aperture value information, the shooting mode information, in-focus state information, and a residual blurring amount. These pieces of information are displayed by operating the MENU setting operation section 39.

Figure 6:
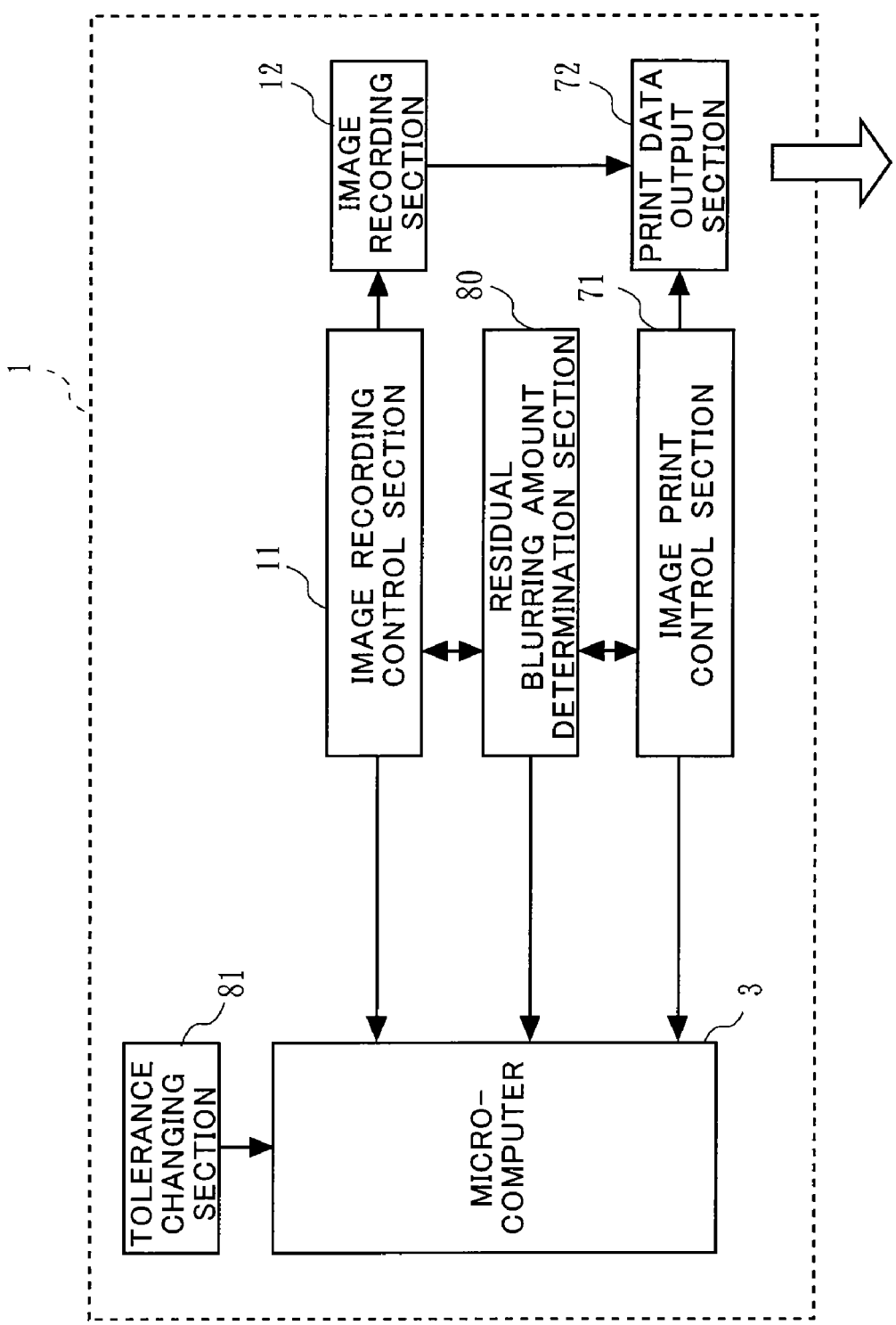
FIG. 6 is a partially enlarged view of a control block relating to printing performed by the digital camera shown in FIG. 1.

FIG. 6 shows only an essential part of a control block of the digital camera 1. As shown in FIG. 6, the image print control section 71 is controlled by the control signal outputted by the microcomputer 3, and generates print data to cause a printing device 74 (not shown), which is externally connected thereto, to print out the shot image. The print data output section 72 outputs the image file including the image signal stored in the image recording section 12 or the buffer memory 9 to a recording section of the printing device 74 via a USB (Universal Serial Bus) cable 73 (not shown), in accordance with a command outputted by the image print control section 71. The residual blurring amount determination section 80 determines, with respect to the residual blurring amount of the shot image, whether or not the blurring is conspicuous at the time of printing on a paper sheet of a predetermined size. A method of printing the shot image and the like will be described later.

Figure 2:
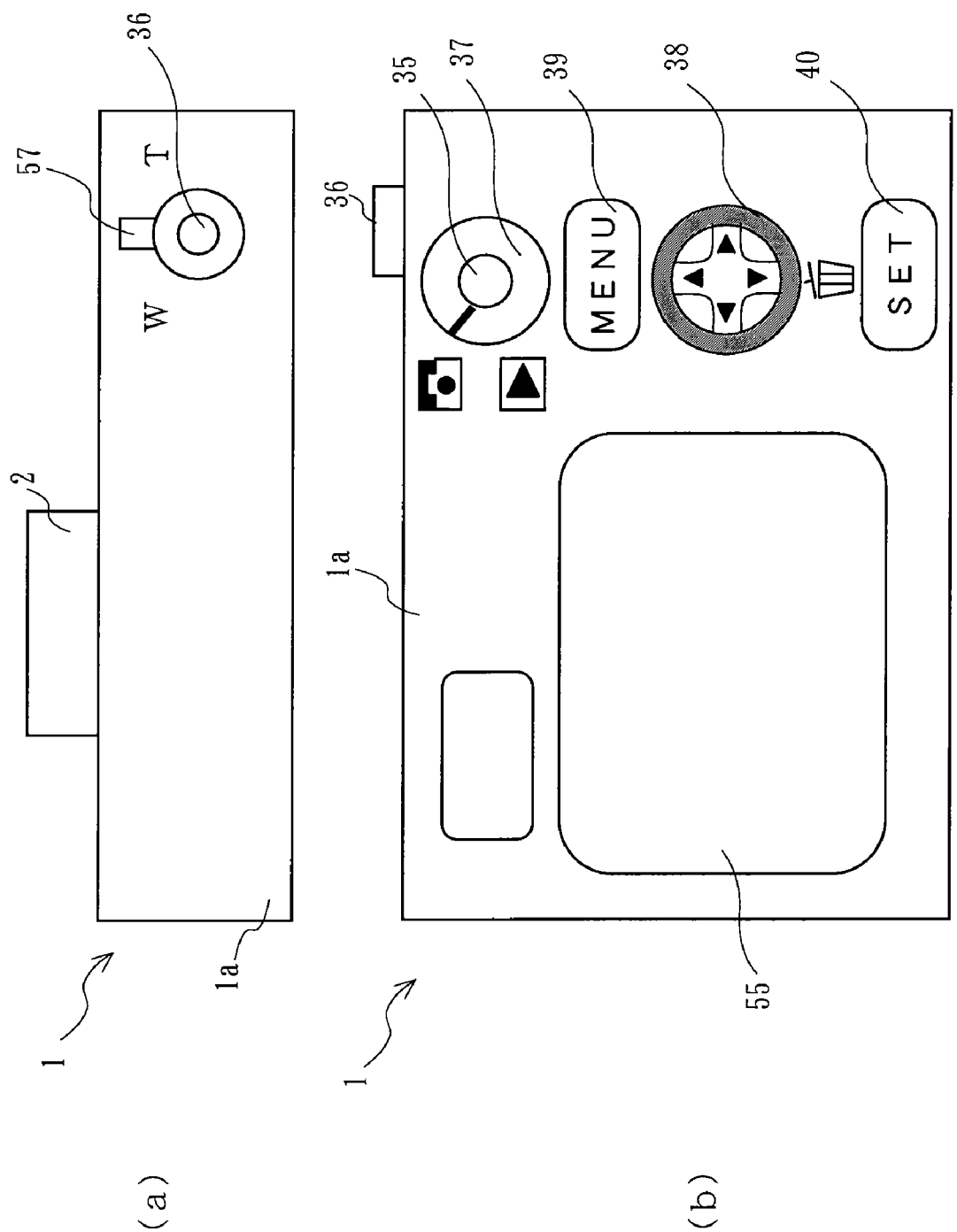
FIG. 2 is a diagram showing top and back views of the digital camera shown in FIG. 1.

Next, with reference to FIG. 2, an external configuration of the digital camera 1 will be described. FIG. 2(a) shows a top surface of the digital camera 1, and FIG. 2(b) shows a back surface of the digital camera 1. A housing 1a has, situated on a front surface thereof, an imaging optical system including a lens barrel 2, and also has, situated on a back surface thereof, the power switch 35, the shooting/reproduction switching operation section 37, the cross operation key 38, the MENU setting operation section 39, the SET operation section 40, and a display section 55 composed of an LCD monitor. Further, the housing 1a has, situated on a top surface thereof, the shutter operation section 36 and a zoom operation section 57.

The zoom operation section 57 is rotatably located in the vicinity of the shutter operation section 36 so as to be coaxial with the shutter operation section 36. The power switch 35 is an operation member for turning the power of the digital camera 1 ON/OFF. The shooting/reproduction switching operation section 37 is an operation member for switching between a shooting mode and a reproduction mode, and the switching is performed by rotating a lever thereof. Under the condition that the shooting mode is selected, the imaging optical system L is controlled by the microcomputer 3 so as to be a telephoto mode in the case where the zoom operation section 57 is turned in the right direction, and as to be a wide-angle mode in the case where the zoom operation section 57 is turned in the left direction.

The MENU setting operation section 39 is an operation member for displaying various menus on the display section 55. The cross operation key 38 is an operation member for causing the microcomputer 3 to output an execution command when a user presses any one of upper, lower, right and left portions thereof so as to select any one of various operation menus, which are displayed on the display section 55 by operating the MENU setting operation section 39. The SET operation section 40 is an operation member which is used when the user resets a display of the various operation menu to a state prior to the display thereof.

Figure 3:
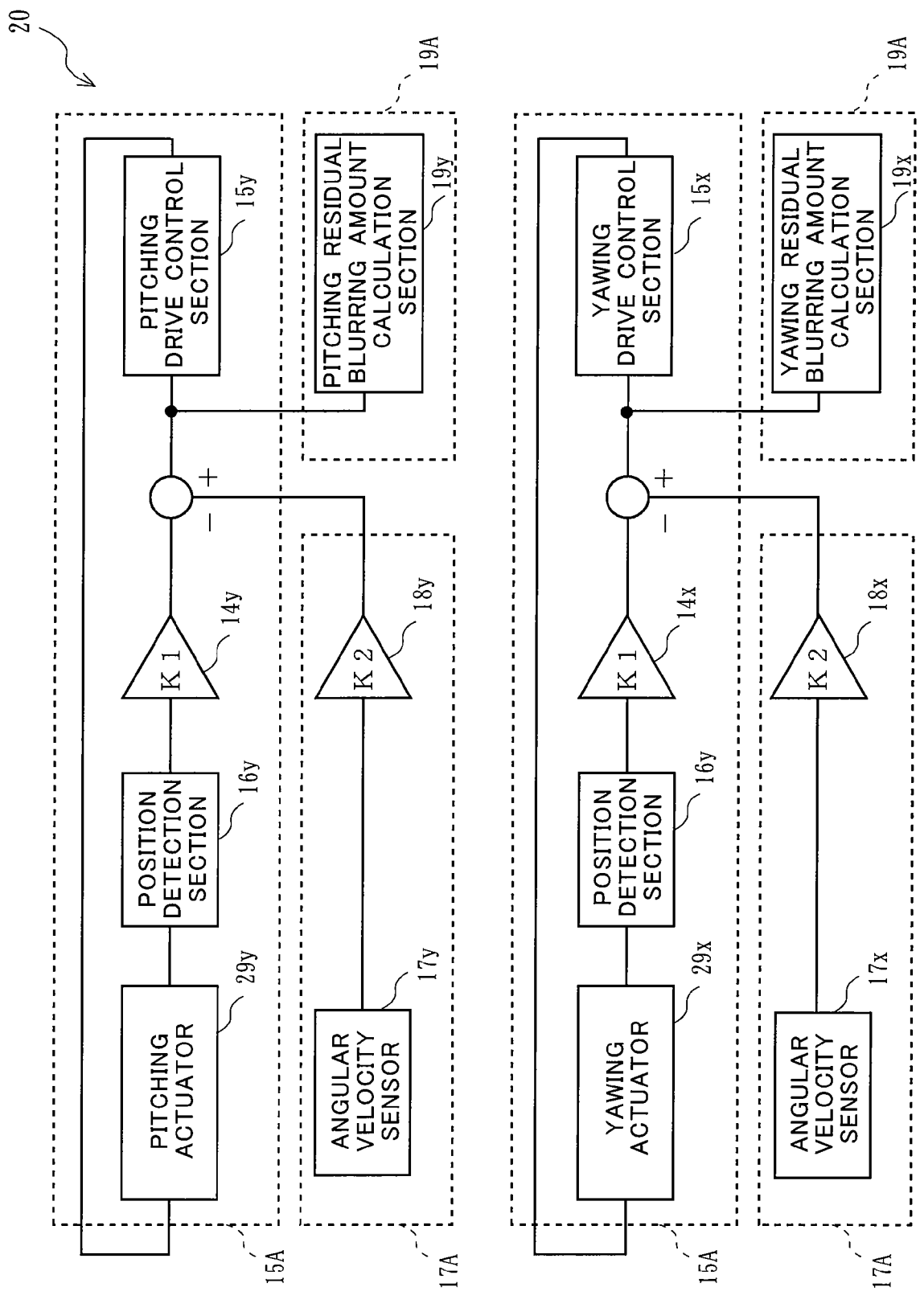
FIG. 3 is a block diagram showing a control system of an image blurring compensation mechanism used for the digital camera shown in FIG. 1.

Next, with reference to FIG. 3, a control system of an image blurring compensation unit will be described. As shown in FIG. 3, the image blurring compensation mechanism 20 includes a motion detection section 17A, a motion compensation section 15A, and a residual blurring amount calculation section 19A.

The motion detection section 17A includes a yawing angular velocity sensor $17x$ and a pitching angular velocity sensor $17y$. For the sake of avoiding redundancy, the yawing angular velocity sensor $17x$ and the pitching angular velocity sensor $17y$ are abbreviated as an angular velocity sensor $17x$ and an angular velocity sensor $17y$, respectively. The angular velocity sensor $17x$ and the angular velocity sensor $17y$ are each a sensor for detecting a motion of the imaging device including the imaging optical system L, the motion being caused by hand blurring or any other vibration. The angular velocity sensor $17x$ and the angular velocity sensor $17y$ detect motion in two directions, i.e., a yawing direction and a pitching direction, respectively. The angular velocity sensor $17x$ and the angular velocity sensor $17y$ each uses an output during the digital camera 1 being at rest as a reference, and outputs an angular velocity signal having either of a positive or a negative value in accordance with a direction in which the digital camera 1 moves.

Signals outputted by the angular velocity sensor $17x$ and the angular velocity sensor $17y$ are respectively subjected to processes such as filtering, integration, phase compensation, gain adjustment, and clipping performed by signal processing sections $18x$ and $18y$. Based on the above-described processes, the microcomputer 3 calculates a drive control amount of the second lens unit L2, the drive control amount being necessary for motion compensation, and generates a control signal for blurring compensation.

The motion compensation section 15A, which controls an optical axis of imaging light, includes the second lens unit L2 (FIG. 1), a yawing drive control section $15x$, a pitching drive control section $15y$, and position detection sections $16x$ and $16y$. The second lens unit L2 is drive-controlled, by the yawing drive control section $15x$ and the pitching drive control section $15y$, in two directions, i.e., an X direction and a Y direction, which are perpendicular to the optical axis AZ. Hereinafter, the X direction is referred to as a yawing direction, and the Y direction is referred to as a pitching direction.

The position detection sections $16x$ and $16y$ are each detection means for detecting a position of the second lens unit L2, and a position detection signal is subjected to a process such as filtering and amplifying performed by the signal processing sections $14x$ and $14y$. Accordingly, the yawing drive control section $15x$ and the pitching drive control section $15y$ form feedback control loops to control the second lens unit L2 such that a difference between a control signal for the blurring compensation generated by the motion detection section 17A and the position detection signal detected by the motion compensation section 15A is zero, drive the second lens unit L2, and compensate a motion of an image.

However, the above-described control system actually has a predetermined frequency response characteristic, and thus the image blurring cannot be compensated completely, and blurring remains as residual blurring. That is, the residual blurring amount is represented as (a signal detected by the motion detection section 17A)—(a positional signal detected by the motion compensation section 15A). Accordingly, the residual blurring amount is inputted to a pitching residual blurring amount calculation section 19y and a yawing residual blurring amount calculation section 19x respectively constituting the residual blurring amount calculation section 19A. Further, residual blurring data is recorded as, for example, Exif data, together with image data. The residual blurring data may contain either of the pitching direction or the yawing direction, or both thereof.

Next, the above-described residual blurring amount will be described. Assuming that a focal length of an optical system is f, and a pitching angle of the digital camera 1 within a predetermined time period (within an exposure time period) is θ, a moving amount recognized on the imaging sensor 4 is represented by equation (1) described below.

$$\Delta Y = f \times \tan \theta \quad (1)$$

Since the hand blurring caused by the photographer or the like tends to appear in the pitching direction predominantly, the residual blurring amount will be described in detail hereinbelow by using a vertical direction of the imaging sensor 4 as an example.

A recording size in the case where a 1/2.5-inch imaging sensor 4 of 5 million pixels is used is 2560 (horizontal direction)×1920 (longitudinal direction) pixels. Assuming that a cell size per pixel of the imaging sensor 4 is 0.0022 [mm] (2.2 microns), a size of the imaging sensor 4 in the vertical direction is approximately 4.2 [mm].

When an optical system with 10× optical zoom is used as the imaging optical system L of the digital camera 1, the focal length f at the 10× magnification is 60 [mm], and a compensation angle of the image blurring compensation mechanism 20 is ±0.3 degrees (0.6 degrees as the amplitude). In this case, a moving amount ΔY of an image on the imaging sensor 4 is calculated as ΔY=60 [mm]×tan (0.6 degrees)=approximately 0.6 [mm], in accordance with above-described equation (1). Therefore, a pixel count corresponding to an image blurring amount in the vertical direction of the imaging sensor 4 is equivalent to 0.6 [mm]/4.2 [mm]×1920=274 pixels.

Further, a suppression degree, which is a numerical value indicative of an effect of the image blurring compensation, is defined as equation (2) described blow.

$$\text{Image blurring suppression degree} = 20 \log(\text{residual blurring amount/blurring amount recognized on the imaging sensor } \mathbf{4}) \text{ [dB]} \quad (2)$$

Therefore, when the image blurring suppression degree of the image blurring compensation mechanism 20 is set to 35 [dB], and then a value of 274 pixels, which represents the image blurring amount recognized on the imaging sensor 4 in the vertical direction and which is obtained by the above-described calculation, are assigned to equation (2), the residual blurring amount is equivalent to approximately 5 pixels.

As above described, in the case where the optical system L having the focal length of f=60 [mm] (telephoto) and the 1/2.5-inch imaging sensor 4 of 5 million pixels are used and further the image blurring suppression degree is set to be 35[dB], the residual blurring amount is equivalent to approximately 5 pixels.

Figure 8:
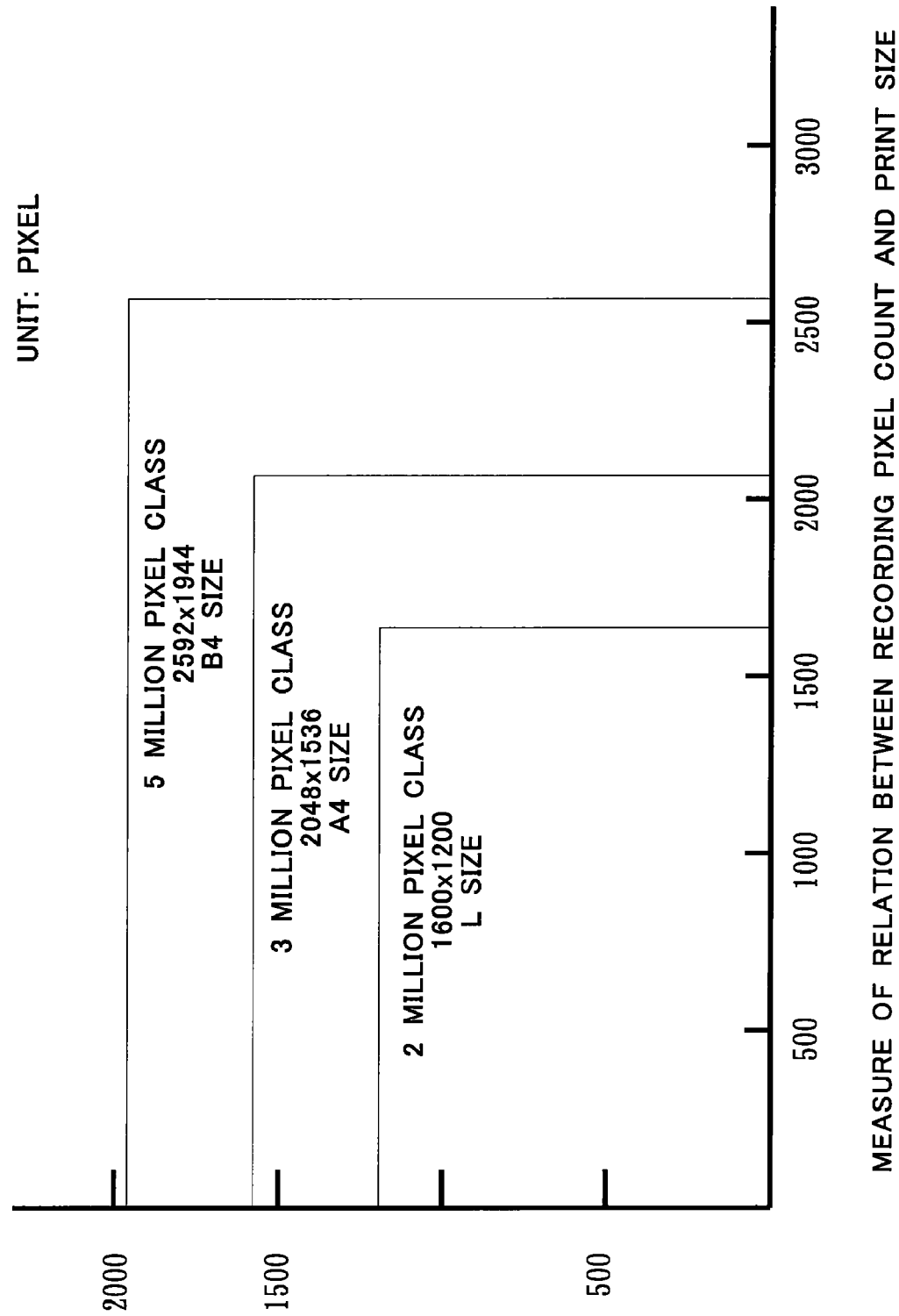
FIG. 8 is a schematic diagram showing a general measure relating to a recording pixel count and a print size.

FIG. 8 shows a general measure relating to a recording pixel count and a print size. The diagram also shows that recommended print sizes for digital cameras of 2 million-pixel, 3 million-pixel and 5 million-pixel classes are an L size, an A4 size, and a B4 size, respectively.

Figure 9:
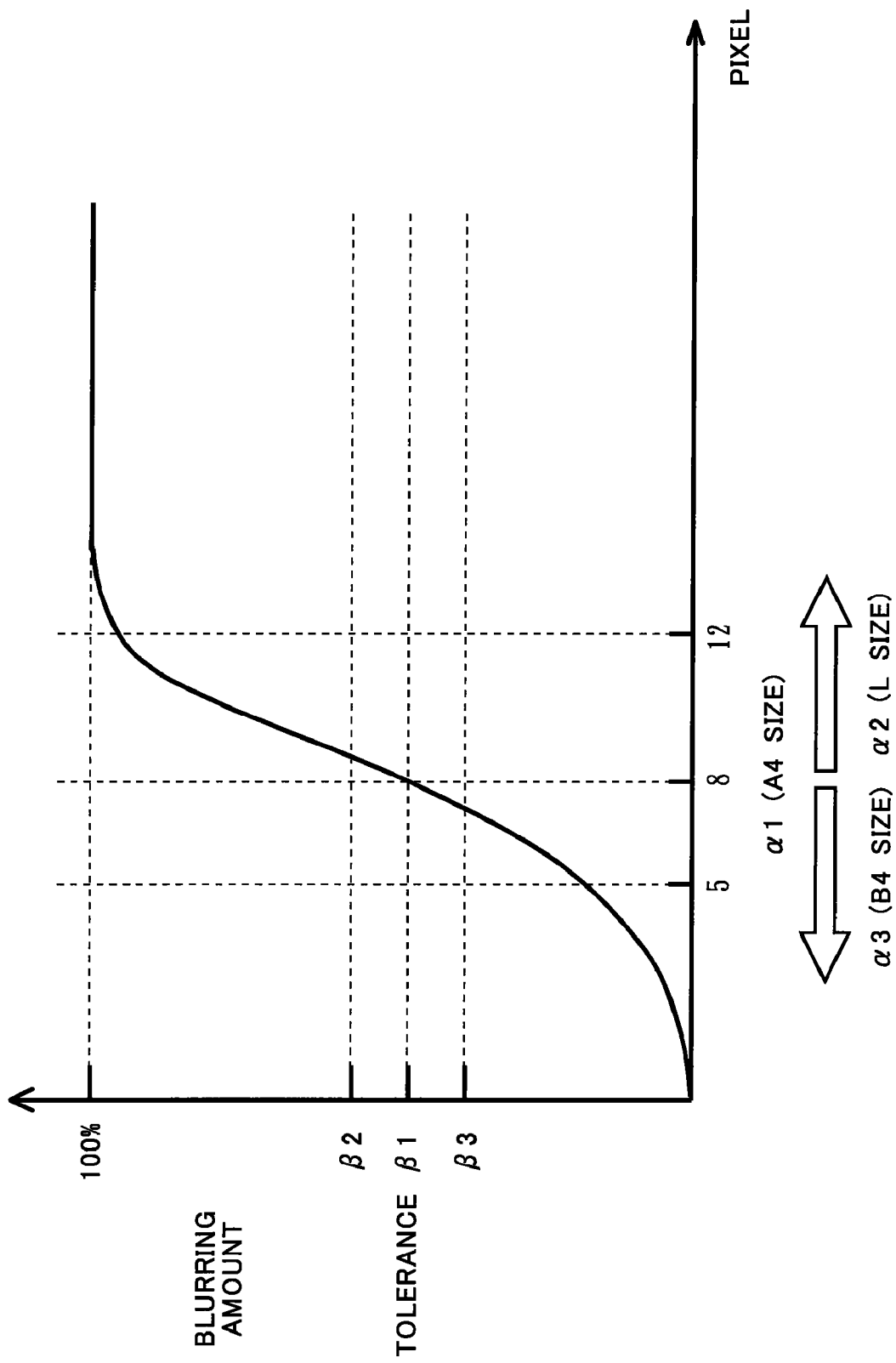
FIG. 9 is a schematic diagram showing a relation between a residual blurring amount and a tolerance thereof according to a first embodiment of the present invention.

FIG. 9 shows a relation between the residual blurring amount and a tolerance thereof. A horizontal axis in the diagram indicates a pixel count of the residual blurring, and a longitudinal axis indicates a degree of the blurring amount perceived by the photographer or the like. The degree of the blurring amount perceived by the photographer or the like is obtained based on data of numerous test subjects. The tolerance represents a threshold criterion at which the photographer or the like determines blurring is hardly recognized in a printed shot image. More specifically, the tolerance is represented by a pixel count of the residual blurring which is determined to be inconspicuous by approximately 70% of the test subjects.

Therefore, according to experiment data as above described, when an shot image is printed on a A4 size sheet by using the digital camera 1 of 5 million pixels, a tolerance β1 at which blurring is hardly recognize disobtained when the residual blurring amount is 8 pixels (α1).

Further, the tolerance β changes depending on the paper size to be used for printing, even if the pixel count of the imaging sensor 4 does not change. That is, in the case of the L size, the paper size is smaller than the A4 size, and thus the tolerance of the residual blurring amount increases. In other words, the tolerance of the residual blurring amount will increase to α2 pixels. On the other hand, in the case of the B4 size, the paper size is larger than the A4 size, and thus the tolerance of the residual blurring amount decreases. That is, the tolerance of the residual blurring amount will decrease to α3 pixels.

Further, when the tolerance changing section 81 is used, it is possible to consider difference among individual photographers or the like. That is, if the tolerance β of the residual blurring is to be increased, the photographer or the like can replace a tolerance β1, which is a previously set value, with a tolerance β2 by using the tolerance changing section 81. Further, when the tolerance β of the residual blurring is to be decreased, the photographer or the like can change the tolerance β to a tolerance β3 by using the tolerance changing section 81. The residual blurring amount determination section 80 determines whether or not blurring is inconspicuous in the case where printing is performed on a paper sheet selected by the photographer or the like, in accordance with the relation between the above-described paper size and the residual blurring amount.

Figure 4:
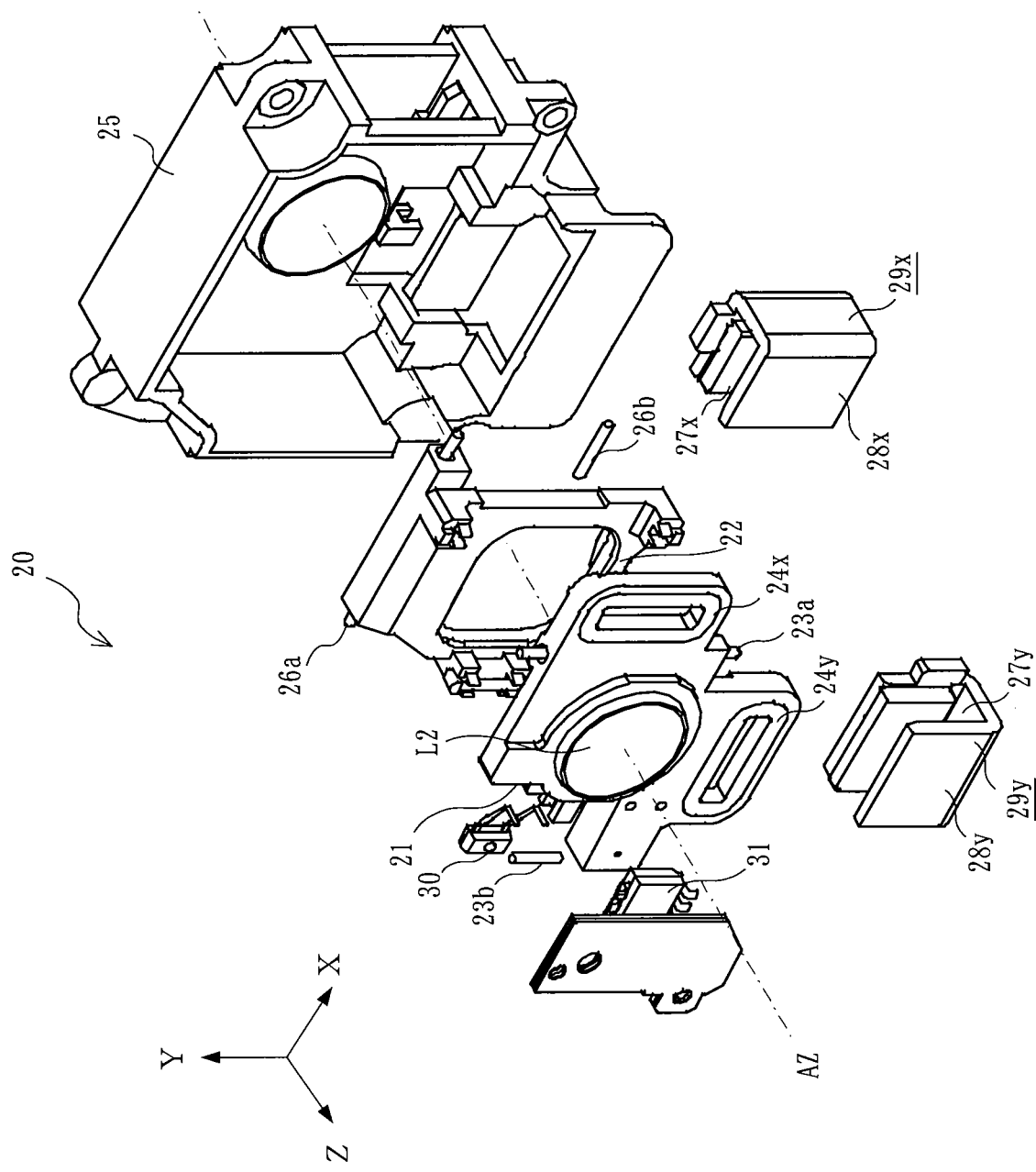
FIG. 4 is an exploded perspective view showing a configuration of the image blurring compensation mechanism shown in FIG. 3.

Next, with reference to FIG. 4, a configuration of the image blurring compensation mechanism 20 used in the present embodiment will be described. As shown in FIG. 4, the image blurring compensation mechanism 20 includes a pitching holding frame 21, a yawing holding frame 22, a fixing frame 25, a yawing actuator 29x, a pitching actuator 29y, a light-emitting element 30, and a photo-detecting element 31.

The pitching holding frame 21 has coils 24x and 24y. The second lens unit L2 and the light-emitting element 30 are fixed to the pitching holding frame 21. The pitching holding frame 21 is coupled to the yawing holding frame 22 via two pitching shafts 23a and 23b so as to be slidable in the Y direction.

The yawing holding frame 22 is coupled to the fixing frame 25 via yawing shafts 26a and 26b so as to be slidable in the X direction.

The yawing actuator 29x has a magnet 27x and a yoke 28x, and is coupled to the fixing frame 25. In a similar manner, the pitching actuator 29y has a magnet 27y and a yoke 28y, and is coupled to the fixing frame 25.

The photo-detecting element 31 is fixed to the fixing frame 25, receives light projected by the light-emitting element 30, and detects two-dimensional position coordinates.

Next, with reference to FIGS. 1 to 3, an operation of the digital camera 1 according to the present embodiment will be described. When photographing, a photographer or the like first turns the power switch 35 to ON, and then selects a shooting mode by using the shooting/reproduction switching operation section 37. Accordingly, the digital camera 1 is shifted to the shooting mode. After the shift to the shooting mode, the hand blurring or vibration applied to the digital camera 1 is detected by the angular velocity sensors 17x and 17y.

The microcomputer 3 gives a command signal to the yawing drive control section 15x and the pitching drive control section 15y so as to compensate image blurring or the like having been caused. An electrical current corresponding to the command signal is supplied to each of the coils 24x and 24y of the pitching holding frame 21. Due to a magnetic circuit generated by the supplied electric current and the magnets 27x and 27y, the pitching holding frame 21 moves within an XY plane perpendicular to the optical axis AZ. The position of the pitching holding frame 21 is detected highly accurately by using the photo-detecting element 31.

In other words, the second lens unit L2 is moved by the image blurring compensation mechanism 20 within a plane perpendicular to the optical axis. Accordingly, an image entering into the imaging sensor 4 via the imaging optical system L can be compensated, whereby it is possible for the photographer or the like to photograph a high-quality image while the image blurring is suppressed. Under this circumstance, the photographer or the like can photograph an object by pressing the shutter operation section 36. An image having been shot is recorded in the image recording section 12.

Figure 5:
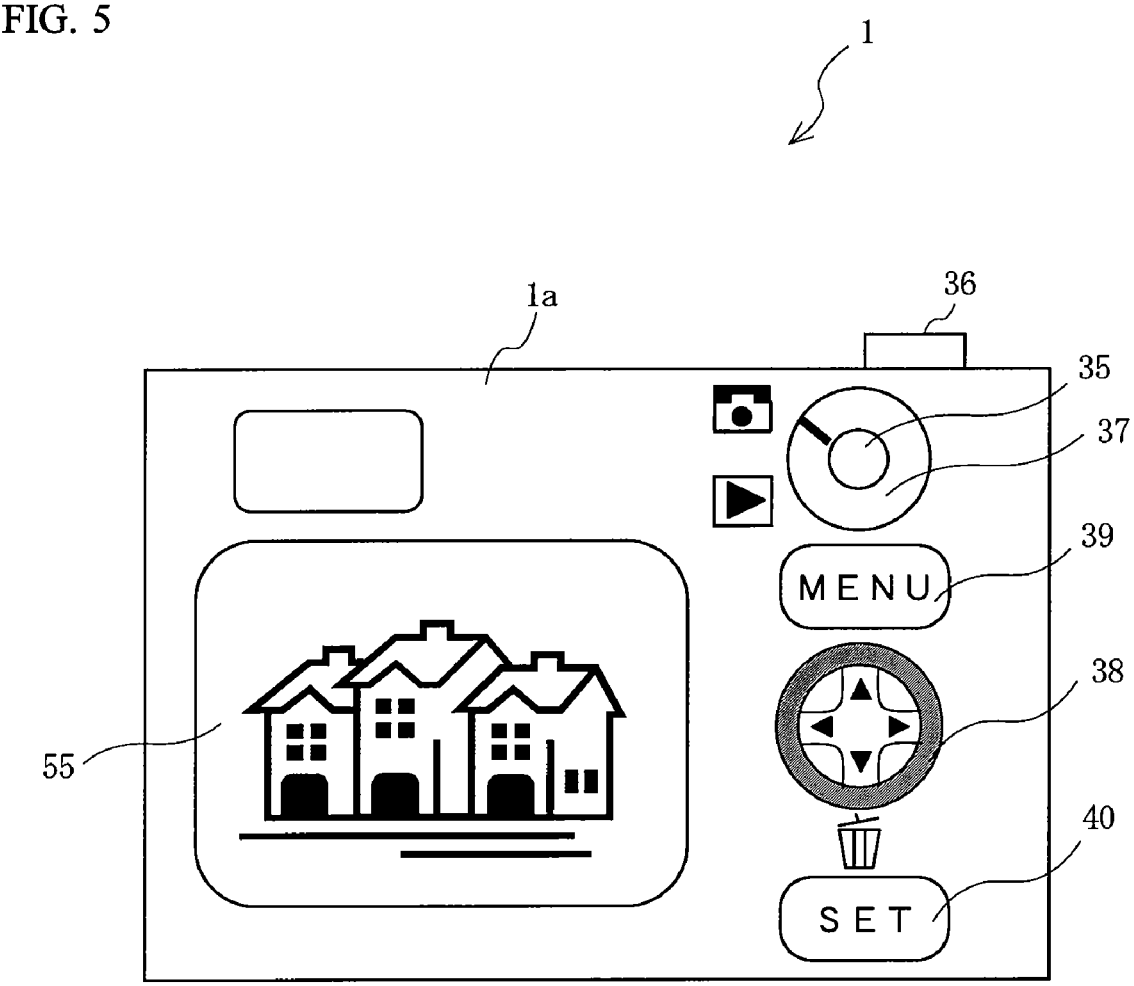
FIG. 5 is a schematic diagram showing a display method of a shot image on a display section shown in FIG. 1.

Next, a method for displaying an image, which is shot by using the digital camera 1, on the display section 55 will be described. In FIG. 5, in order to display the shot image on the display section 55, the power switch 35 is turned to ON, and subsequently the shooting/reproduction switching operation section 37 is turned to the reproduction mode. When an image is selected from among thumbnail images by using the cross operation key 38, one shot image can be displayed on the display section 55.

Figure 7:
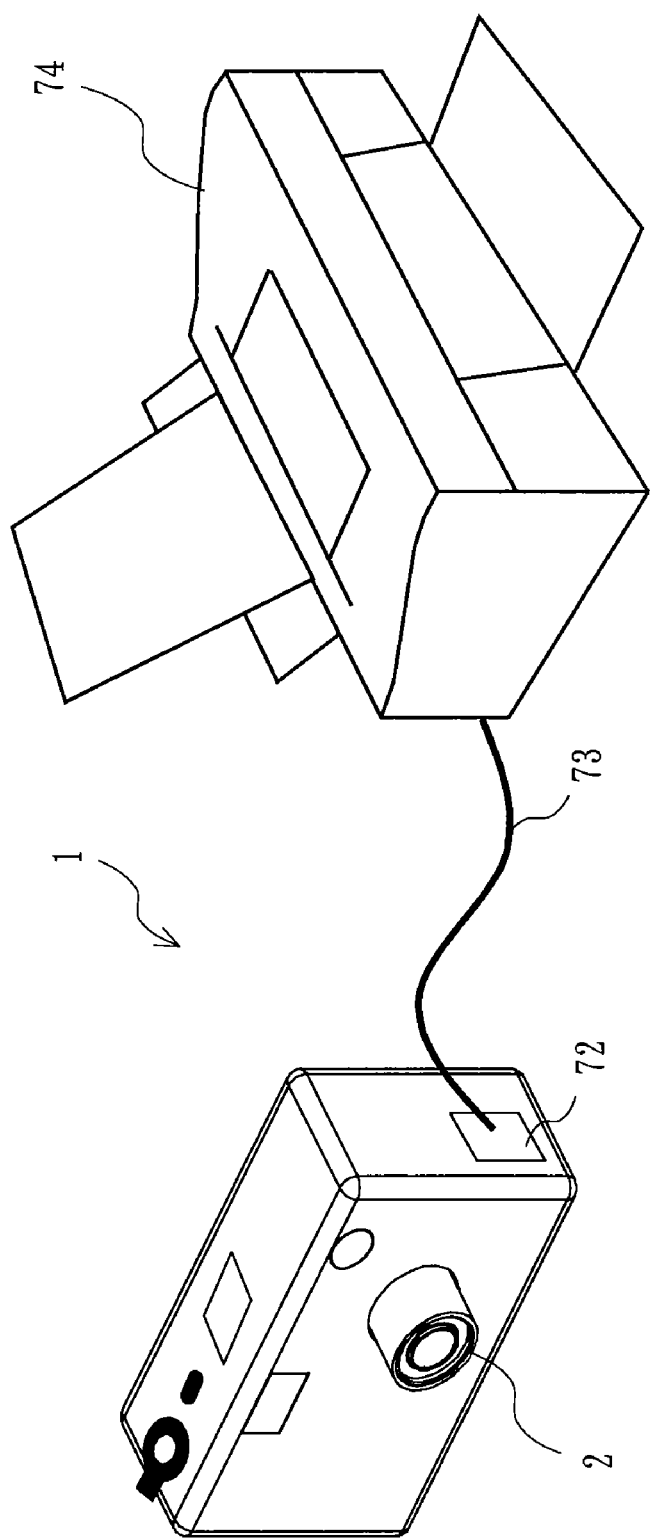
FIG. 7 is a diagram showing an exemplary method for connecting the digital camera according to an embodiment of the present invention to a printing device.

Next, with reference to FIGS. 6 and 7, a method of printing the shot image will be described. FIG. 6 is a diagram showing only an essential part of a control block diagram of the digital camera 1 shown in FIG. 1. As shown in FIG. 7, the digital camera 1 and the printing device 74 are connected to each other via the USB (Universal Serial Bus) cable 73. When determining that "execute print" in a print menu has been selected, the microcomputer 3 sends a print command to the printing device 74. The image print control section 71 corresponds to print control means, and is controlled by a control signal outputted by the microcomputer 3, thereby generating print data relating to the shot image. The print data output section 72 corresponds to print data output means. The print data output section 72 outputs the print data to the printing device 74 via the USB cable 73 in accordance with a command issued by the image print control section 71. The printing device 74 prints the shot image on a paper sheet of a predetermined size in accordance with the forwarded print data and the print command.

Figure 10:
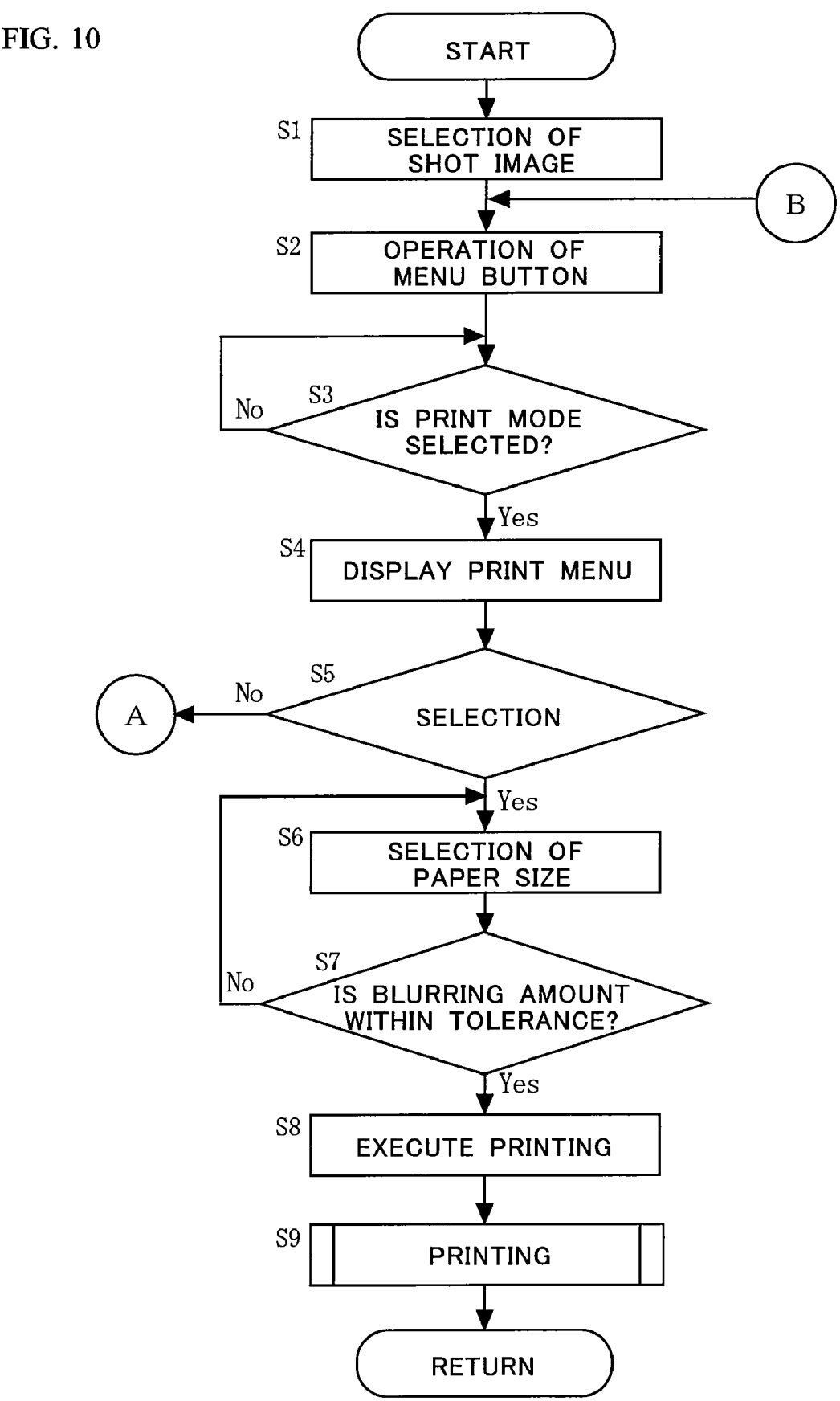
FIG. 10 is a flowchart illustrating a printing process of the digital camera according to the first embodiment of the present invention.

FIG. 10 shows a flowchart illustrating details of a printing process of the shot image. When determining that the shooting/reproduction switching operation section 37 is switched to the reproduction mode and that the shot image is selected by using the cross operation key 38, the microcomputer 3 causes the digital camera 1 to proceed to a next step S2 (step S1). At the time of an image selection, an image may be selected from the thumbnail images, which are reduced images of the shot images and are listed on the display section 55.

After the shot image is selected, the microcomputer 3 determines that the MENU setting operation section 39 has been pressed, and displays a menu screen on the display section 55 (step S2).

The menu screen includes a plurality of process items such as a print mode selection and a shooting mode selection. When the microcomputer 3 determines that the print mode is selected from a menu display, the microcomputer 3 causes the digital camera 1 to proceed to the next step S4 so as to perform a printing process. On the other hand, in the case where the print mode is not selected, a menu screen or a menu relating to various process items is displayed on the display section 55 (step S3)

Figure 11:
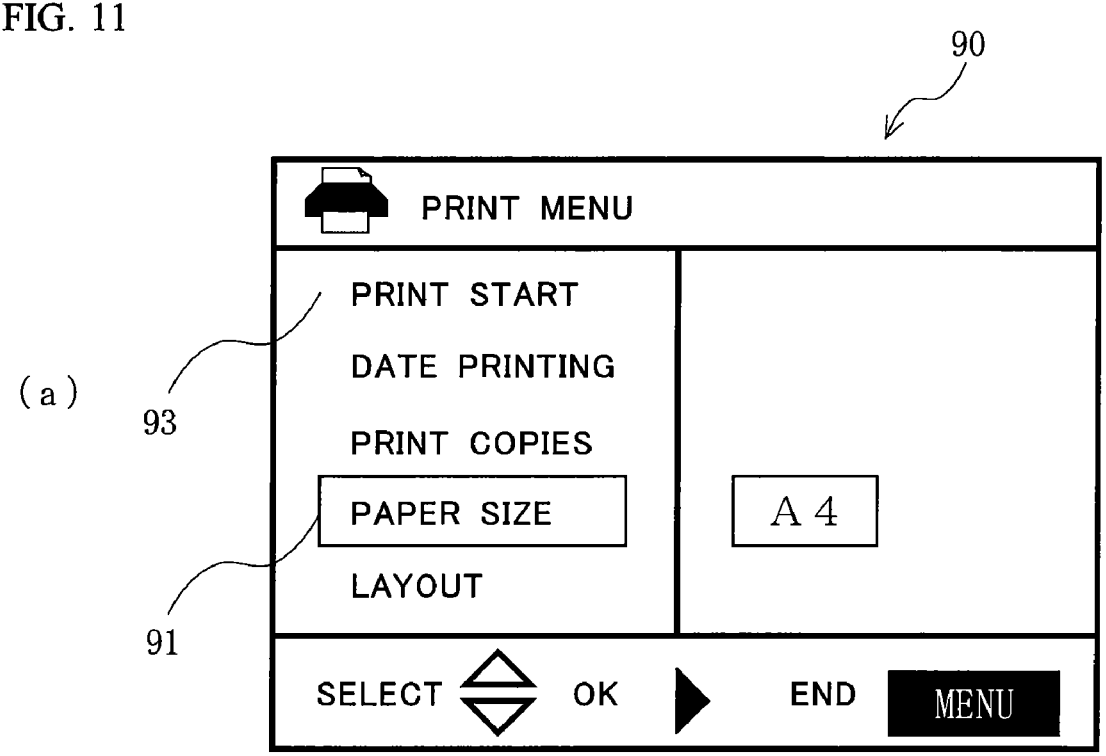
FIG. 11 is a schematic diagram showing a print menu of the digital camera according to the first embodiment of the present invention.
Figure 11:
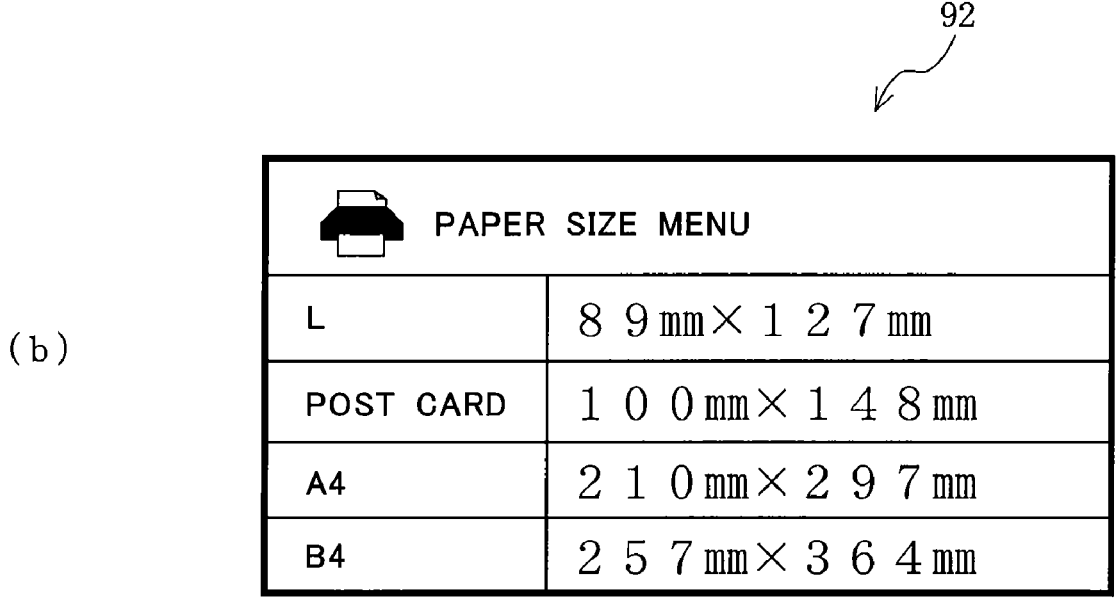

As shown in FIG. 11(a), after the print mode is selected, the microcomputer 3 causes the display section 55 to display the print menu screen 90 (step S4).

The print menu screen 90 enables settings of a print start, date printing, the number of print copies, a paper size, and a layout. In accordance with a selection made by the photographer or the like with an up or down portion of the cross operation key 38, respective processes relating to the print menu screen 90 is performed (step S5).

When the paper size setting icon 91 is selected from the print menu screen 90, a paper size pull-down menu screen 92, which enables a setting of the paper size, is displayed. On the paper size pull-down menu screen 92, as shown in FIG. 11(b), a list relating to the paper size is displayed as a pull-down menu. When it is determined that a predetermined paper size is selected by the cross operation key 38, the pull-down menu is closed, and the paper size having been selected is displayed on the print menu screen 90 (step S6). When any icon other than the paper size setting icon 91 is selected, the process proceeds to other processing A, and predetermined processing is performed.

Figure 12:
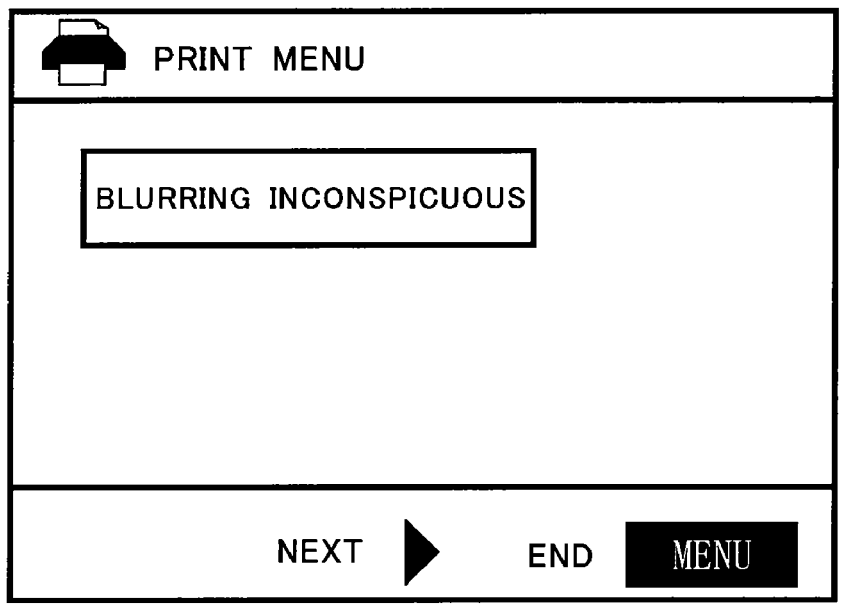
FIG. 12 is a schematic diagram showing a menu issuing a warning to a photographer or the like in accordance with a relation between the residual blurring and a paper size for printing according to the first embodiment of the present invention.
Figure 12:
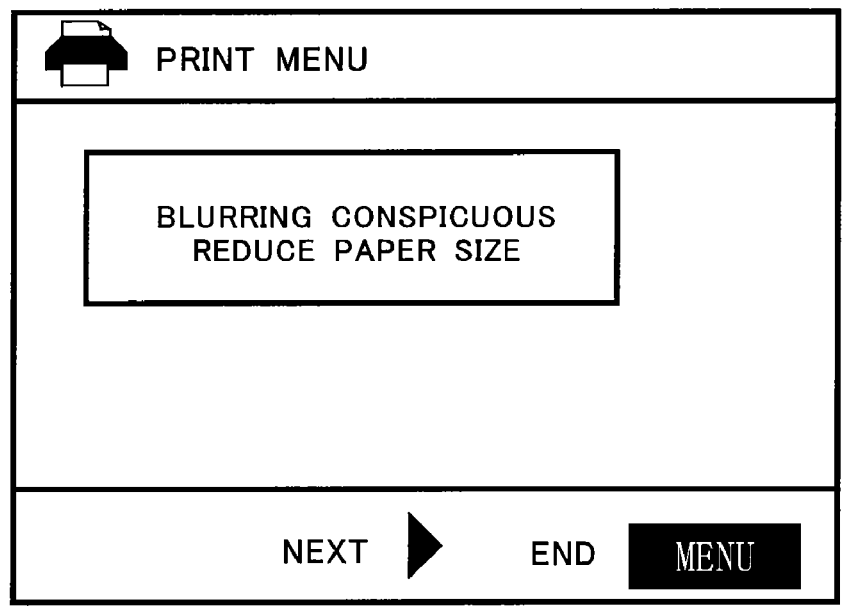

In accordance with the paper size selected by the photographer or the like, the residual blurring amount determination section 80 determines whether or not a residual blurring amount a of the shot image to be printed is equal to or lower than the tolerance β. In the case where the paper size is A4 size and the residual blurring amount α is equal to or lower than the tolerance β1, a display is made so as to indicate that image blurring is inconspicuous, as shown in FIG. 12(a), whereby the photographer or the like can comfortably execute printing. On the other hand, in the case where the residual blurring amount α is higher than the tolerance β1, the residual blurring amount is conspicuous with respect to the paper size having been selected, and thus a notice indicating that the paper size should be reduced is displayed (step S7).

When the print start icon 93 is selected from the print menu screen 90 (step S8), in accordance with the number of the print copies, the print layout, and the like which have been specified, the microcomputer 3 executes the printing process for causing the externally-connected printing device 74 to execute printing (step S9).

Figure 13:
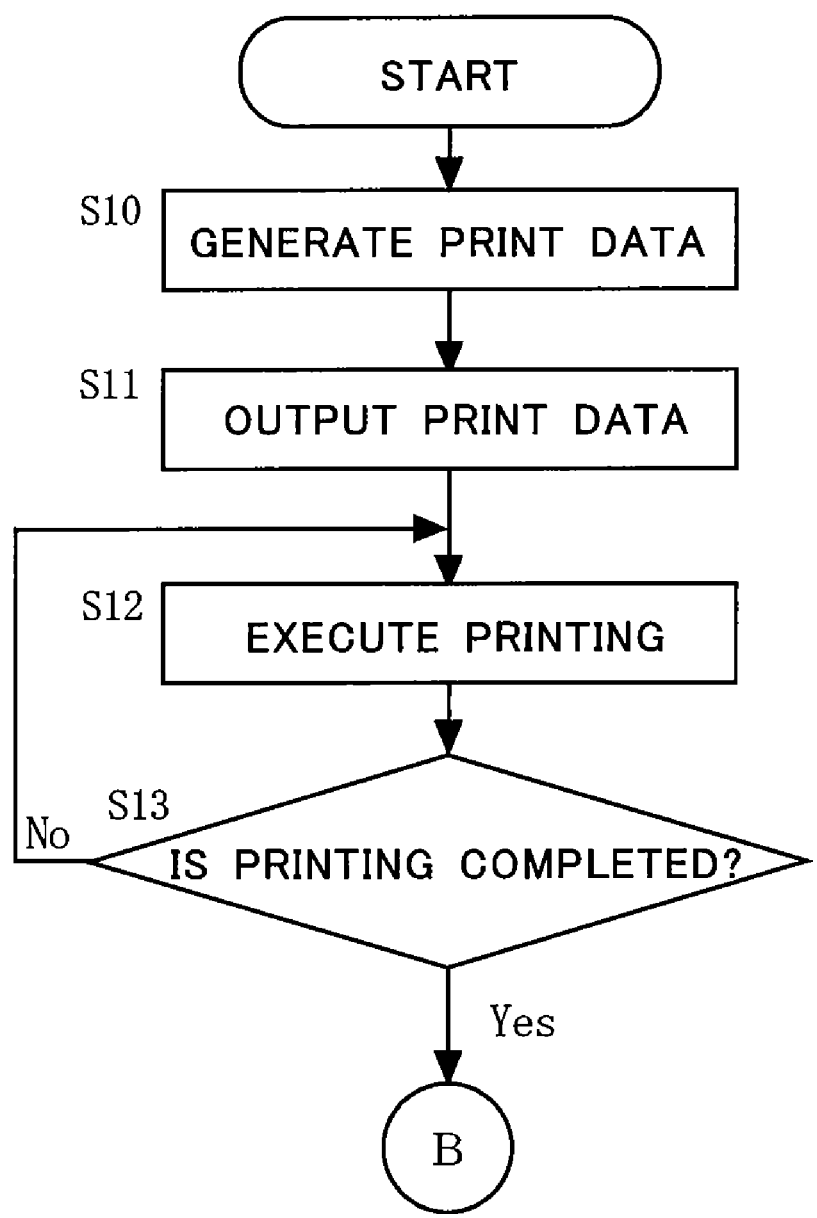
FIG. 13 is a flowchart illustrating the printing process according to the first embodiment of the present invention.

FIG. 13 shows a flowchart illustrating details of the printing process. When the process corresponding to the print start icon 93 is executed, the microcomputer 3 causes the image print control section 71 to generate the print data relating to the shot image, the number of the print copies, and the like (step S10).

The generated print data is outputted by the print data output section 72 (step S11).

The printing device 74 then prints the shot image in accordance with a print execution command given by the microcomputer 3 and the print data (step S12).

Subsequently, the printing device 74 executes printing of the selected number of the print copies. The microcomputer 3 confirms that a predetermined number of the print copies have been printed (step S13), and, thereafter, causes the display section 55 to display the print menu screen 90.

As above described, in the digital camera according to the present embodiment, whether or not the residual blurring amount is within a predetermined level is determined based on the printing paper size, and is informed to the photographer or the like, whereby it is possible for the photographer or the like to determine in advance whether or not printing may be performed appropriately. Accordingly, it is possible to avoid waste of printing paper.

In the present invention, the number of the print copies and the print layout are not restrictive. In the case where a plurality of shot images are printed on one sheet of paper, the residual blurring amount may be determined in accordance with a size of each of the shot images to be actually printed. The configuration of the image blurring compensation mechanism is not limited to the above-described example.

Numerical values for determining the tolerance of the residual blurring amount or the like are not limited to examples described above. The digital camera described in the present embodiment has 5 million pixels, and in the case where the pixel count changes, the tolerance may also be changed. That is, in the case where the pixel count is large, the tolerance may be decreased, and in the case where the pixel count is small, the tolerance may be increased. Further, the digital camera is not limited to such a configuration in which the shot image or the like is displayable on a display section thereof. The digital camera may cause an external monitor connected thereto or a printing device including a display section to perform displaying.

A cable connecting the digital camera and the printing device is not limited to the USB cable. For example, connection may be made by using an IEEE1394 serial bus cable, a wireless LAN or the like.

In a similar manner, without using the cable for connecting the digital camera to the printing device, the print data may be recorded in a removable memory. Further, printing may be performed through a printing device which is capable of having the removable memory inserted therein. That is, the cable may be replaced with an appropriate bridge media typified by the removable memory.

It goes without saying that a similar effect can be obtained from an integrated configuration in which the digital camera includes the printing device, instead of separate configurations each for the digital camera and the printing device.

Respective component parts included in a printing system may be combined to one another arbitrarily. For example, the printing system may be constituted of a plurality of devices in which the imaging optical system, imaging means and residual blurring determination means are physically separated from the other component parts. The combinations of the component parts are not limited thereto. Therefore, it goes without saying that the printing system is adaptable to an interchangeable lens system such as a single lens reflex.

Although an exemplary digital camera including recording means for recording a shot image is described, the digital camera is not limited thereto. For example, a cradle which includes a hard disc and is capable of recording and accumulating the shot image without using a cable for connection with the digital camera may be used. Further, a device controlling the printing device may be a data storage device which includes the hard disk or the like for storing a large amount of shot images and does not include the imaging optical system. In the case where the display section and the image print control section are provided to the data storage device, the device can be used in the same manner as the digital camera.

Second Embodiment

Hereinafter, with reference to FIGS. 14, 15, 16 and 17, a second embodiment of the present invention will be described. Although a digital camera according to the present embodiment is configured in the same manner as the camera 1 according to the above-described first embodiment, an operation of a printing process thereof is different. Hereinafter, the operation will be described.

Figure 14:
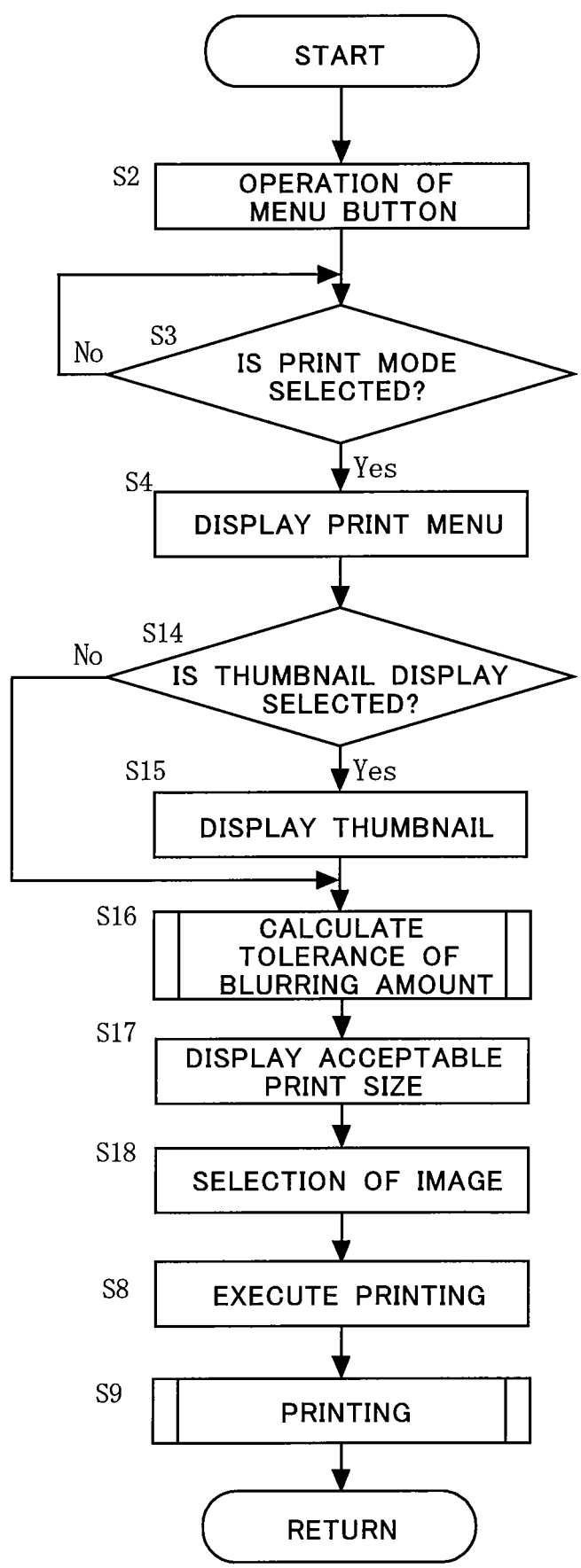
FIG. 14 is a flowchart illustrating a printing process of a digital camera according to a second embodiment of the present invention.

FIG. 14 shows a flowchart illustrating details of the printing process of a shot image. In steps S2, S3, S4, S8, and S9 shown in FIG. 14, basically the same processes as those in corresponding steps shown in FIG. 10 are performed. In other words, processes additionally adopted in the present embodiment are performed in steps S14, S15, S16, S17, and S18 shown in FIG. 14.

Specifically, after the microcomputer 3 determines that a reproduction mode is selected by using a shooting/reproduction switching operation section 37, and that a MENU setting control section 39 has been pressed, the microcomputer 3 causes a display section 55 to display a menu screen to wait for a button operation by a user (START). The menu screen includes a plurality of process items such as a print mode selection and a shooting mode selection.

The microcomputer 3 determines whether or not the print mode is selected (step S3) in response to the button operation by the user (S2). Specifically, in the case where it is determined that the print mode is selected, the microcomputer 3 causes the digital camera 1 to proceed to next step S4 for performing the printing process. On the other hand, in the case where it is determined that the print mode is not selected, the menu screen, or a menu relating to each of the process items is displayed on the display section 55.

Figure 15:
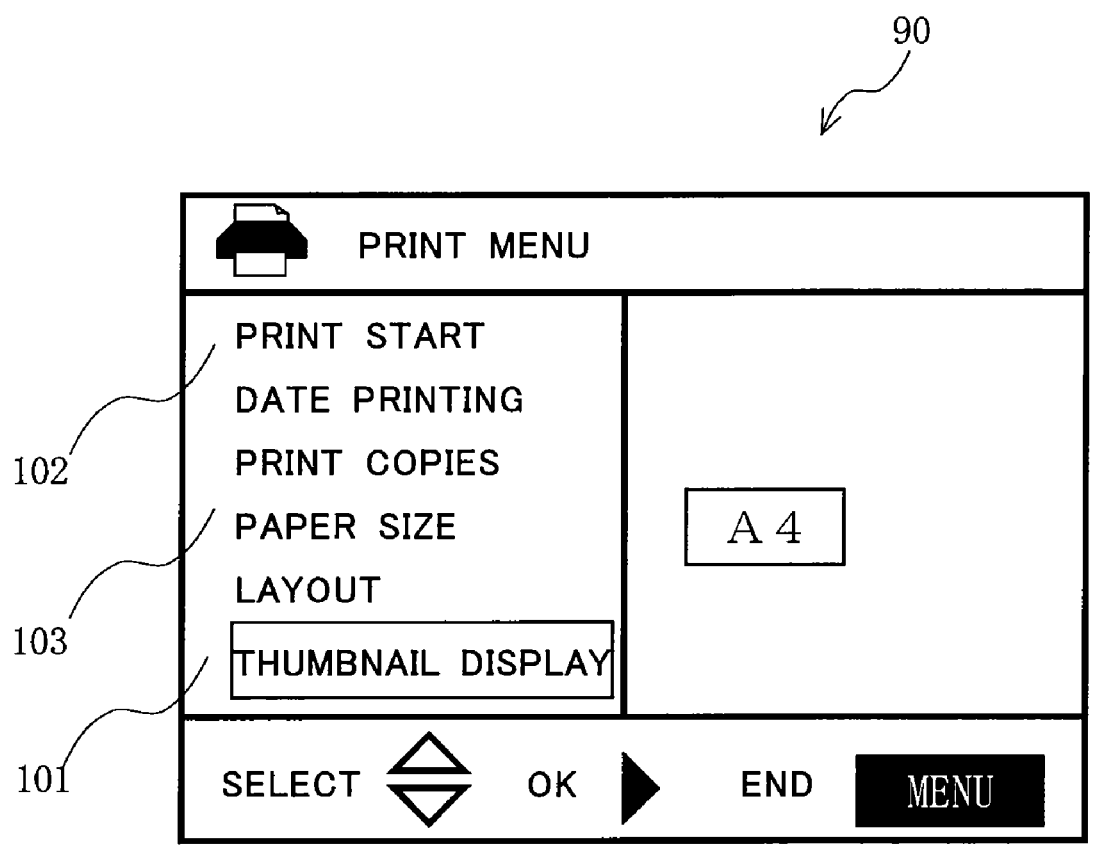
FIG. 15 is a schematic diagram showing a print menu of the digital camera according to the second embodiment of the present invention.

In the case where it is determined that the print mode is selected (step S3), the microcomputer 3 causes the display section 55 to display a print menu screen 90 as illustrated in FIG. 15 (step S4). In the print menu screen 90, it is possible to set a print start, date printing, the number of print copies, a paper size, a layout, and a thumbnail display. In accordance with a selection of settable items made by the user with an up or down portion of the cross operation key 38, respective processes related to the print menu screen 90 can be performed.

Figure 16:
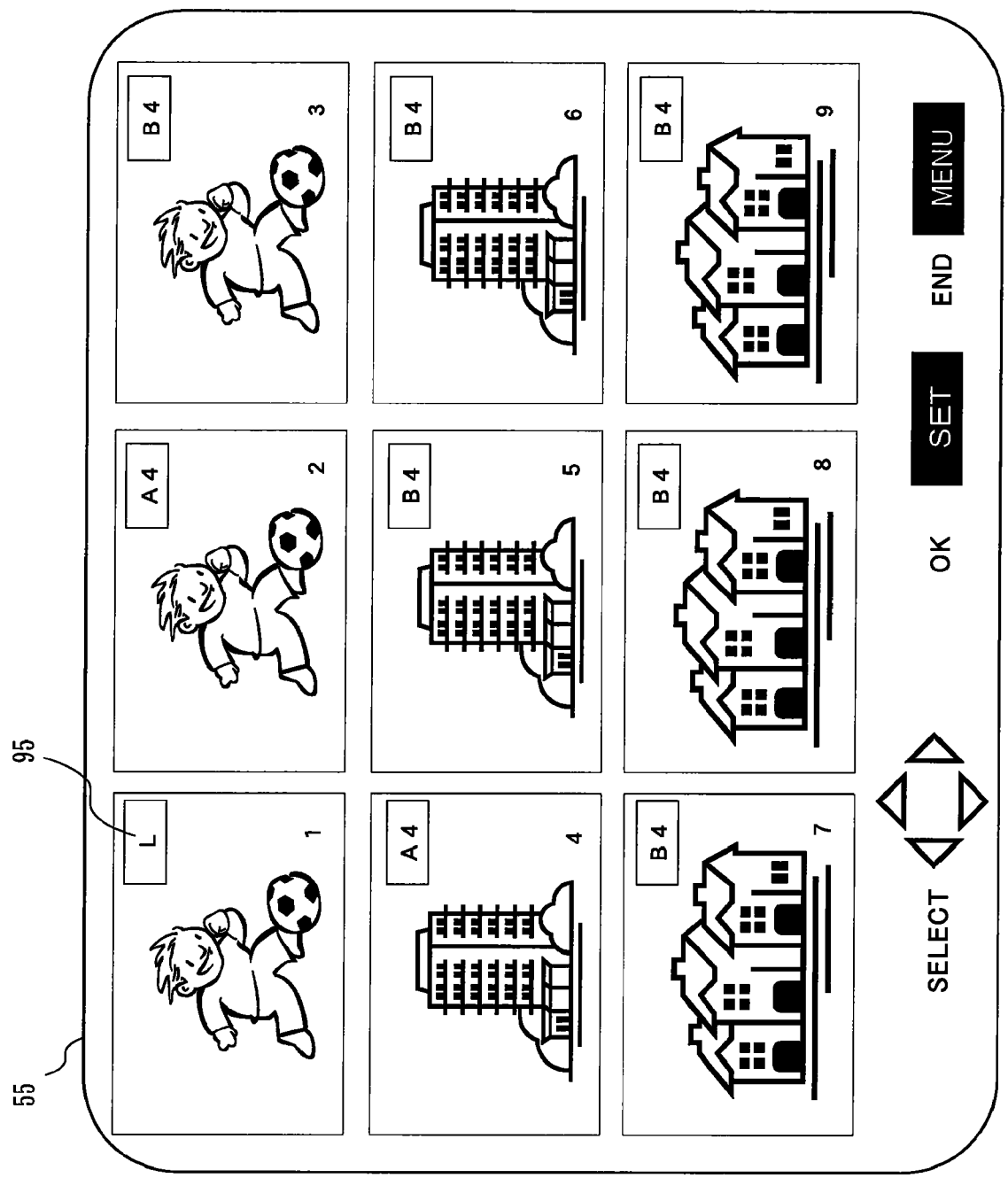
FIG. 16 is a diagram showing an exemplary display of recommended paper size displayed on thumbnail images of shot images in the digital camera according to the second embodiment of the present invention.

The microcomputer 3 determines whether or not the thumbnail display is selected, in response to the operation of the cross operation key 38 by the user (step S14). Specifically, when a thumbnail display icon 91 is selected from the print menu screen 90, a thumbnail image list as shown in FIG. 16 is displayed on the display section 55 (step S15).

A residual blurring amount is calculated by reading from the shot image (step S16), and a recommended paper size icon 95 determined based on the calculated residual blurring amount is displayed (step 17).

With reference to exemplary thumbnail images 1 to 9 (the numbers are each described at a bottom right part of each of the thumbnail images on the right) shown in FIG. 16, a recommended paper size will be described. According to the thumbnail images displayed, a recommended paper size for a shot image 1 is an L size, a recommended paper size for shot images corresponding to thumbnail images 2 to 4 is an A4, and a recommended paper size for remaining shot images is a B4. That is, indicated in the residual blurring amount determination section 80 is that the residual blurring amount of the shot image corresponding to the thumbnail image 1 is $\alpha 2$ as shown in FIG. 9, the residual blurring amount of the shot image corresponding to thumbnail 2 to 4 is $\alpha 1$, and the residual blurring amount for the remaining shot images is $\alpha 3$. In other words, the residual blurring amount determination section 80 calculates the residual blurring amount of each of the shot images, determines tolerance $\beta$ thereof, and calculates a maximum paper size thereof in which image blurring is inconspicuous.

The photographer or the like selects the recommended paper size icon 95 displayed on the thumbnail image in a manner as described above (step S18), whereby it is possible to recognize the maximum paper size in which the image blurring is inconspicuous.

When a print start icon 102 is selected in the print menu screen 90 shown in FIG. 15 (step S8), the microcomputer 3 executes the printing process for causing an externally connected printing device 74 to execute printing in accordance with the number of the print copies, the print layout, and the like which have been specified (step S9). In the case where the thumbnail display is not selected in the step S4, only one image is displayed on the display section 55, and the same processes as those of step S16 and thereafter are performed.

With regard to printing, following a selection of a paper size icon 103, a paper size pull-down menu screen 94 allowing specification of the paper size may be displayed. In this case, a list relating to the paper size as shown in FIG. 11(b) is displayed on the paper size pull-down menu screen 94, as a pull-down menu. When it is determined that a predetermined paper size has been selected by using the cross operation key 38, the pull-down menu is closed, and a paper size having been selected is displayed on the print menu screen 90. A system may be configured such that, in the case where it is determined that a blurring amount is large with respect to a predetermined print size, a notice indicating that the blurring amount is large is provided to a photographer.

By using the digital camera 1 according to the present embodiment, an appropriate print size corresponding to the residual blurring amount is calculated, and the calculated print size is informed to a photographer or the like in association with a shot image. As a result, the photographer or the like can recognize a recommended print size for each of the shot images, and consequently need not be bothered with decision about the paper size to be printed, whereby it is possible to improve the convenience of the photographer or the like.

In the present embodiment, although the recommended paper size icon 95 is displayed on the thumbnail image, the icon may be displayed when one shot image is displayed on the display section 55. Further, the icon is displayed not only at the time of the print mode, but the icon may be also displayed at the time of normal reproduction mode. In this case, it is further preferable that the photographer or the like can select display/non-display of the icon.

Figure 17:
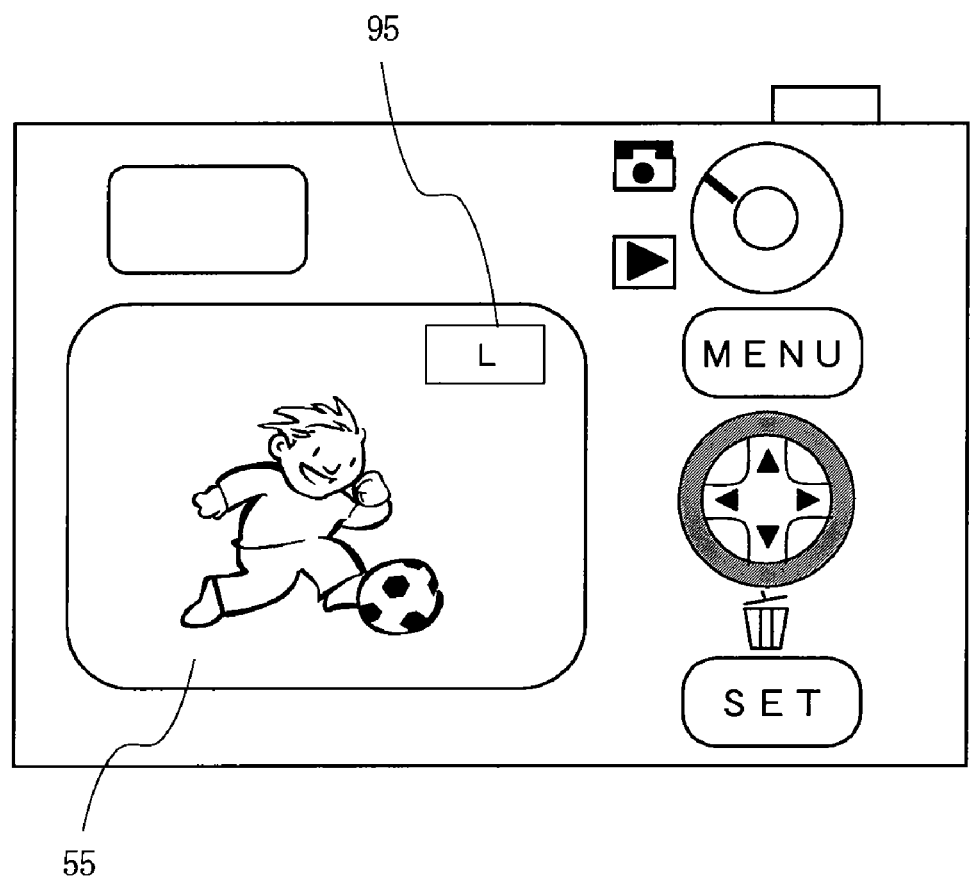
FIG. 17 is a confirmation image displayed immediately after shooting on the digital camera according to the second embodiment of the present invention.

In the present embodiment, the recommended paper size icon 95 may be displayed on a reproduced image, but may be displayed on the display section 55, as shown in FIG. 17, at the time of confirming an image immediately after shooting. In this case, the photographer or the like can immediately confirm a recommended paper size, and thus can promptly photograph again in the case where the photographer or the like cannot select a desirable paper size due to a significant hand blurring. Accordingly, it is possible to eliminate a problem that the shot image can not be printed in a desirable paper size at the time of printing the shot image.

In the case where no image blurring is caused because of shooting with a tripod, and thus no residual blurring remains, a maximum printing paper size, which is determined based on the pixel count of an imaging sensor 4 used for shooting, may be displayed on the paper size icon 95.

The number of the print copies, and the layout to be printed are not restrictive. In the case where a plurality of shot images are printed on one paper sheet, the residual blurring amount may be determined in accordance with a size of each of the shot images to be actually printed.

Further, a configuration of the image blurring compensation mechanism is not restrictive. Further, numerical values determining a tolerance of the residual blurring amount or the like are not limited to those examples above described. Although the present embodiment is configured such that the shot image or the like is displayable on the display section of the digital camera, the configuration is not restrictive. The shot image or the like may be displayed on any appropriate component. For example, the digital camera may cause an external monitor connected thereto or a printing device including a display section to perform displaying.

In the present embodiment, as a cable for connecting the digital camera and the printing device, a USB cable is exemplified, but it is not limited to this. For example, connection may be made by using an IEEE1394 serial bus cable or made wirelessly by using a wireless LAN or the like.

In the present embodiment, although the digital camera is connected to the printing device via the cable, it is not limited to this. For example, the above-described print data may be recorded in a bridge media such as a removable memory. Further, printing may be performed through a printing device which is capable of having the removable memory inserted therein.

In the present embodiment, although the digital camera and the printing device are configured separately from each other, it is not limited to this. A similar effect can be obtained from an integrated configuration in which the digital camera includes the printing device.

Further, a method for recording the residual blurring data according to the present invention may be such that the residual blurring data and the image data are recorded separately from each other, but are interrelated with each other. Further, a simplified system without incorporating the image blurring compensation mechanism 20 may be adopted, in which a result of detection by the motion detection section 17A is written into image data, and whether or not an image is appropriate for printing is determined in accordance with an amount of a motion detection. Further, a system operable to analyze image data having been shot, perform arithmetic processing, and extract a blurring amount at the time of shooting, without the motion detection section 17A being incorporated, may be adopted.

Respective component parts included in the printing system according to the present embodiment may be combined with one another arbitrarily. For example, the system may be constituted of a plurality of devices in which an imaging optical system, imaging means, and residual blurring determination means are physically separated from the other components. Combination of the component parts is not limited thereto. Therefore, it goes without saying that the system is adaptable to an interchangeable lens system such as a single lens reflex.

In the present embodiment, although an example of the digital camera including recording means for recording the shot image is described, the digital camera is not limited thereto. For example, a cradle which includes a hard disc and is capable of recording and accumulating the shot image without using a cable for connection with the digital camera may be used. Further, a device controlling the printing device may be a data storage device which includes the hard disk or the like for storing a large amount of shot images and does not include the imaging optical system. In the case where the display section and the image print control section are provided to the data storage device, the device can be used in the same manner as the digital camera.

INDUSTRIAL APPLICABILITY

An imaging device and a printing device of the present invention are adaptable to a digital still camera, a digital video camera, a camera-equipped cellular phone and a PDA, which are all required to perform a convenient print display relating to a method for printing a shot image.

The invention claimed is:

1. An imaging device operable to output an optical image of an object as an electrical image signal and transfer the electrical image signal to a connected printing device, the imaging device comprising:
   an imaging optical system for generating the optical image of the object;
   an imaging sensor for receiving the optical image generated by the imaging optical system, and converting the optical image into the electrical image signal;
   a blurring detection unit for detecting image blurring in the imaging optical system;
   an image blurring compensation unit for compensating the image blurring on the imaging sensor;
   a compensation amount detection section for detecting an image blurring compensation amount compensated by the image blurring compensation unit;
   a calculation section for calculating a residual blurring amount by subtracting the image blurring compensation amount from an image blurring amount;
   an image recording section for recording the image signal, as a shot image, together with the calculated residual blurring amount;
   a print size specification section for specifying a print size of the shot image;
   a print control section for generating print data in accordance with the shot image;
   a print data output section for outputting the generated print data; and
   a determination section for storing a tolerance of the residual blurring amount with respect to the print size and determining whether or not the calculated residual blurring amount is greater than the tolerance, wherein:
   the determination section issues a warning in the case where the calculated residual blurring amount is greater than the tolerance with respect to a predetermined print size, and
   the tolerance of the residual blurring amount with respect to a particular print size is changeable.

2. The imaging device according to claim 1, wherein the determination section indicates a change in the print size in the case where the calculated residual blurring amount is greater than the tolerance with respect to the predetermined print size.

3. A printing device, comprising:
   an image reading section for reading a shot image having added thereto a residual blurring amount of an imaging device at the time of shooting;
   a print size specification section for specifying a print size of the shot image;
   a print control section for generating print data in accordance with the shut image;
   a print data output section for outputting the generated print data;
   a printing section for printing the shot image in accordance with the print data outputted by the print data output section; and
   a determination section for storing a tolerance of the residual blurring amount with respect to the print size and determining whether or not the residual blurring amount added to the shot image is greater than the tolerance, wherein:
   the determination section issues a warning in the case where the residual blurring amount is greater than the tolerance with respect to a predetermined print sizes, and
   the tolerance of the residual blurring amount with respect to a particular print size is changeable.

4. The printing device according to claim 3, wherein the determination section indicates a change in the print size in the case where the residual blurring amount is greater than the tolerance with respect to the predetermined print size.

5. A printing system in which an imaging device and a printing device are interconnectable with each other, wherein:
   the imaging device includes:
      an imaging optical system for generating an optical image of an object;
      an imaging sensor for receiving the optical image generated by the imaging optical system, and converting the optical image into an electrical image signal;
      a blurring detection unit for detecting image blurring in the imaging optical system;
      an image blurring compensation unit for compensating the image blurring on the imaging sensor;
      a compensation amount detection section for detecting an image blurring compensation amount compensated by the image blurring compensation unit;
      a calculation section for calculating a residual blurring amount by subtracting the image blurring compensation amount from an image blurring amount;
      an image recording section for recording the image signal, as a shot image, together with the calculated residual blurring amount;
      a print size specification section for specifying a print size of the shot image;
      a print control section for generating print data in accordance with the shot image;
      a print data output section for outputting the generated print data; and
      a determination section for storing a tolerance of the residual blurring amount with respect to the print size, and determining whether or not the calculated residual blurring amount is greater than the tolerance,
   the printing device includes a printing section for printing the shot image in accordance with the print data outputted by the print data output section, the determination section issues a warning in the case where the calculated residual blurring amount is greater than the tolerance with respect to a predetermined print size, and the tolerance of the residual blurring amount with respect to a particular print size is changeable.

6. The printing system according to claim 5, wherein the determination section indicates a change in the print size in the case where the calculated residual blurring amount is greater than the tolerance with respect to the predetermined print size.

7. An imaging device operable to output an optical image of an object as an electrical image signal and transfer the electrical image signal to a connected printing device, the imaging device comprising:
an imaging optical system for generating the optical image of the object;
an imaging sensor for receiving the optical image generated by the imaging optical system, and converting the optical image into the electrical image signal;
a blurring detection unit for detecting image blurring in the imaging optical system;
an image blurring compensation unit for compensating the detected image blurring;
a compensation amount detection section for detecting an image blurring compensation amount having been compensated;
a calculation section for calculating a residual blurring amount by subtracting the image blurring compensation amount from a detected image blurring amount;
an image recording section for recording the image signal, as a shot image, together with the calculated residual blurring amount;
a display section for displaying the shot image;
a print control section for generating print data in accordance with the shot image;
a print data output section for outputting the generated print data; and
a determination section for storing a tolerance of the residual blurring amount with respect to the print size at a time of printing, and determining whether or not the calculated residual blurring amount is equal to or lower than the tolerance, wherein:
the determination section calculates the print size such that the calculated residual blurring amount is equal to or lower than the tolerance, and causes the display section to display the calculated print size together with the shot image.

8. The imaging device according to claim 7, wherein the tolerance of the residual blurring amount with respect to a particular print size is changeable.

9. A printing device, comprising:
an image reading section for reading a shot image having added thereto a residual blurring amount of an imaging device at the time of shooting;
a display section for displaying the shot image;
a print control section for generating print data in accordance with the shot image;
a print data output section for outputting the generated print data;
a printing section for printing the shot image in accordance with the outputted print data; and
a determination section for storing a tolerance of the residual blurring amount with respect to a print size at a time of printing, and determining whether or not the residual blurring amount added to the shot image is equal to or lower than the tolerance, wherein the determination section calculates the print size such that the residual blurring amount is equal to or lower than the tolerance, and causes the display section to display the calculated print size together with the shot image.

10. The printing device according to claim 9, wherein the tolerance of the residual blurring amount with respect to a particular print size is changeable.

11. A printing system in which an imaging device and a printing device are interconnectable with each other, wherein:
the imaging device includes:
an imagine optical system for generating an optical image of an object;
an imaging sensor for receiving the optical image generated by the imaging optical system, and converting the optical image into an electrical image signal;
a blurring detection unit for detecting an image blurring in the imaging optical system;
an image blurring compensation section for compensating the detected image blurring;
a compensation amount detection section for detecting the compensated image blurring amount;
a calculation section for calculating a residual blurring amount by subtracting the image blurring compensation amount from a detected image blurring amount;
an image recording section for recording the image signal, as a shot image, together with the calculated residual blurring amount;
a display section for displaying the shot image;
a print control section for generating print data in accordance with the shot image;
a print data output section for outputting the generated print data; and
a determination section for storing a tolerance of the residual blurring amount with respect to a print size at the time of printing, and determining whether or not the calculated residual blurring amount is equal to or lower than the tolerance,
the printing device includes a printing section for printing the shot image in accordance with the outputted print data, and
the determination section calculates the print size such that the calculated residual blurring amount is equal to or lower than the tolerance, and causes the display section to display the calculated print size together with the shot image.

12. The print system according to claim 11, wherein the tolerance of the residual blurring amount with respect to a particular print size is changeable.

13. An image printing method for printing at least one shot image stored in a recording section together with a residual blurring amount, the printing method comprising:
reading the shot image and the residual blurring amount from the recording section;
calculating a print size such that the read residual blurring amount is equal to or lower than a tolerance which is predetermined with respect to the shot image;
displaying the calculated print size together with the read the shot image;
selecting said at least one shot image;
generating print data of the selected shot image; and
outputting the generated print data.

14. The image printing method according to claim 13, further comprising printing the shot image in accordance with the outputted print data.

15. An imaging device comprising:
an imaging optical system for generating an optical image of an object;

an imaging sensor for receiving the optical image generated by the imaging optical system, and converting the optical image into an electrical image signal;

a blurring detection unit for detecting image blurring in the imaging optical system;

an image blurring compensation unit for compensating the detected image blurring;

a compensation amount detection section for detecting an image blurring compensation amount having been compensated;

a calculation section for calculating a residual blurring amount by subtracting the image blurring compensation amount from a detected image blurring amount;

an image recording section for recording the image signal, as a shot image, together with the calculated residual blurring amount;

a display section; and a determination section for storing a tolerance of the residual blurring amount with respect to the print size at a time of printing, and determining whether or not the calculated residual blurring amount is equal to or lower than the tolerance, wherein the determination section calculates the print size such that the calculated residual blurring amount is equal to or lower than the tolerance, and causes the display section to display the calculated print size together with the shot image.

* * * * *